US011010817B2

(12) United States Patent
Soundararajan et al.

(10) Patent No.: US 11,010,817 B2
(45) Date of Patent: May 18, 2021

(54) SYSTEMS AND METHOD FOR COORDINATING TREND DATA VIA A HUB

(71) Applicant: ServiceNow, Inc., Santa Clara, CA (US)

(72) Inventors: Bharath Soundararajan, Sunnyvale, CA (US); Amir Vakili Jafari, Los Gatos, CA (US); Ryan Meonske, San Jose, CA (US); Senthil Rajavallipuram Meenakshisundaram, Fremont, CA (US); Shilpa Subhash Deshmukh, San Jose, CA (US); Brandy Joe Frederick, San Jose, CA (US); Denise Michelle Wilson, Carlsbad, CA (US); Ankur Tayal, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 363 days.

(21) Appl. No.: 15/915,990

(22) Filed: Mar. 8, 2018

(65) Prior Publication Data
US 2019/0279275 A1 Sep. 12, 2019

(51) Int. Cl.
*G06Q 30/00* (2012.01)
*G06Q 30/06* (2012.01)
*G06Q 50/00* (2012.01)
*G06F 9/54* (2006.01)

(52) U.S. Cl.
CPC ..... *G06Q 30/0633* (2013.01); *G06Q 30/0631* (2013.01); *G06Q 30/0641* (2013.01); *G06Q 50/01* (2013.01); *G06F 9/547* (2013.01)

(58) Field of Classification Search
CPC . G06Q 30/0601–0645; G06Q 30/0633; G06Q 30/0631; G06Q 30/0641; G06Q 50/01
USPC .............................................. 705/26.1–27.2
See application file for complete search history.

(56) References Cited

U.S. PATENT DOCUMENTS

| | | |
|---|---|---|
| 7,020,706 B2 | 3/2006 | Cates |
| 7,716,353 B2 | 5/2010 | Golovinsky |
| 7,769,718 B2 | 8/2010 | Murley |
| 7,925,981 B2 | 4/2011 | Pourheidari |
| 8,402,127 B2 | 3/2013 | Solin |
| 8,468,125 B2 * | 6/2013 | Tarnoff ................. G06F 16/254 707/610 |
| 8,612,408 B2 | 12/2013 | Trinon |
| 8,832,652 B2 | 9/2014 | Mueller |
| 9,098,322 B2 | 8/2015 | Apte |
| 9,104,483 B2 | 8/2015 | Natarajan et al. |
| 9,317,327 B2 | 4/2016 | Apte |

(Continued)

OTHER PUBLICATIONS

Onion, Bill. What is Middleware and Why Should You Care. Jan. 29, 2015 (Jan. 29, 2015). Briteskies Blog. (Year: 2015).*

*Primary Examiner* — Allison G Wood
(74) *Attorney, Agent, or Firm* — Fletcher Yoder PC

(57) ABSTRACT

A system includes a non-transitory memory and one or more hardware processors configured to perform operations including receiving, via a product model API, product model data for a product sold by a vendor, receiving from the vendor, via an offer API, offer data corresponding to one or more promotional offers for the product, processing, via a deal hub, the offer data, generating a catalog item for the product, and displaying the catalog item within a catalog.

20 Claims, 25 Drawing Sheets

(56) References Cited

U.S. PATENT DOCUMENTS

| | | | |
|---|---|---|---|
| 9,363,252 B2 | 6/2016 | Mueller | |
| 9,645,833 B2 | 5/2017 | Mueller | |
| 9,654,473 B2 | 5/2017 | Miller | |
| 9,766,935 B2 | 9/2017 | Kelkar | |
| 9,792,597 B1* | 10/2017 | Jen | G06Q 10/087 |
| 9,805,322 B2 | 10/2017 | Kelkar | |
| 2003/0229559 A1 | 12/2003 | Panttaja et al. | |
| 2011/0177799 A1* | 7/2011 | Ramer | G06Q 30/02 |
| | | | 455/414.1 |
| 2011/0251917 A1* | 10/2011 | Etzioni | G06Q 10/02 |
| | | | 705/26.4 |
| 2012/0290430 A1* | 11/2012 | Hershenson | G06Q 10/10 |
| | | | 705/26.7 |
| 2013/0145319 A1* | 6/2013 | Wein | G06Q 30/0603 |
| | | | 715/811 |

* cited by examiner

FIG. 4

NEW SECTION – ADP0001043    400    FOLLOW ▾  UPDATE DELETE

402
- NUMBER: ADP0001043 — 404
- PRIORITY: 1 – CRITICAL — 406
- IMPACT: 1 – HIGH — 408
- EXPECTED START: 08-08-2017 10:56:06 — 410
- EXPECTED END: 08-09-2017 10:56:08 — 412
- ACTIVE: ☑
- STATE: OPEN — 414
- *FREQUENCY: DAILY — 416
- DATA OVERRIDE: YES — 418

420 — DATA SOURCE | DESTINATION | MIDDLEWARE | APPROVALS — 426

422
- PLATFORM: SAP — 430
- NEW URL: https://ecc-prod330.sap.com
- AUTHENTICATION USER: SAPECC.ADMIN — 438
- TABLE: *BOW-IBM — 442

424
- APPLICATION: ASSET ACCOUNTING — 434
- NEW URL: https://surf.service-now.com — 436
- AUTHENTICATION PASSWORD: ********** — 440
- MAP FROM (FIELD):
- ACQUISITION COST (USD) — 444

428

UPDATE DELETE — 448

APPROVERS (1) | EVENTS | TASK ACTIVITIES — 450

APPROVERS  NEW  EDIT...    GO TO  STATE ▾  SEARCH

446
APPROVAL FOR = ADP0001043
≡ STATE         ≡ APPROVER
☐ ⓘ = REQUESTED    BHARATH RAJAN
☐ ACTIONS ON SELECTED ROWS... ▾

452
≡ COMMENTS    ≡ CREATED
              08-08-2017 11:00:05

| CONFIGURATION ITEMS | SERVICENOW | | | | |
|---|---|---|---|---|---|
| https://embrajan.service-now.com /cmdb_cl_list.do?sysparm_target=x_snc_configurable_adapters_table.source_table& | | | | | |

≡ CONFIGURATION ITEMS  [NEW]  [GO TO] [NAME ▼] [SEARCH]   [1] 1 TO 20 OF 2750 ▷ ▷▷

| ≡ NAME ▲ | ≡ MANUFACTURER | ≡ CLASS | ≡ LOCATION | ≡ ASSIGNED TO | ≡ MODEL ID |
|---|---|---|---|---|---|
| [SEARCH] | [SEARCH] | [SEARCH] | [SEARCH] | [SEARCH] | [SEARCH] |
| *ANNIE-IBM | LENOVO | COMPUTER | 820 E. ST. CENTRAL SAN DIEGO, CA | ANNIE APPROVER | LENOVO THINKSTATION S20 |
| *ASSET-IBM | LENOVO | COMPUTER | 3 WHITEHALL COURT, LONDON | ASSET MANAGER | LENOVO THINKSTATION S20 |
| *BETH-IBM | LENOVO | COMPUTER | 6411 NW BARRY RD, KANSAS CITY MO | BETH ANGLIN | LENOVO THINKSTATION S20 |
| *BOW-IBM | LENOVO | COMPUTER | 13518 POWAY ROAD, POWAY, CA | BOW RUGGERI | LENOVO THINKSTATION S20 |

NEW SECTION - ADP0001043  400  FOLLOW ▾ UPDATE DELETE

| Field | Value |
|---|---|
| NUMBER | ADP0001043 — 402 |
| PRIORITY | 1 - CRITICAL — 404 |
| IMPACT | 1 - HIGH — 406 |
| EXPECTED START | 08-08-2017 10:56:06 — 408 |
| EXPECTED END | 08-09-2017 10:56:08 — 410 |
| ACTIVE | ☑ |
| STATE | OPEN — 414 |
| * FREQUENCY | DAILY — 416 |
| DATA OVERRIDE | YES — 418 |

424 · 412

DATA SOURCE | DESTINATION | MIDDLEWARE | APPROVALS — 426
420 — 422

* ADAPTER / MESSAGING TYPE: MULESOFT — 700
INFRASTRUCTURE: — NONE —
URL: JSON
  MID_SERVER
  MULESOFT
706 — STATUS: REST
DX RECOMMENDED: SOAP — 428

708

UPDATE DELETE — 448

APPROVERS (1) | EVENTS | TASK ACTIVITIES — 450
446

☰ APPROVERS NEW EDIT...   GO TO  STATE ▾  SEARCH    ◁◁ ◁  1  TO 1 OF 1 ▷ ▷▷

▽ APPROVAL FOR = ADP0001043
🔍 = STATE
ⓘ  ≡ REQUESTED    ≡ APPROVER       ≡ COMMENTS    ≡ CREATED
☐                 BHARATH RAJAN       452         08-08-2017 11:00:05

☐ ACTIONS ON SELECTED ROWS... ▾    ◁◁ ◁  1  TO 1 OF 1 ▷ ▷▷

SYSTEMS AND METHOD FOR COORDINATING TREND DATA VIA A HUB

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An enterprise may utilize multiple platforms to conduct its operations. For example, the enterprise may use a first platform for human resources (HR), a second platform for payroll, a third platform for purchasing, a fourth platform for information technology (IT) (e.g., email, networking, data storage, computer logins), and a fifth platform for accounting. Due to differences in data formatting and communication processes, data sharing between platforms may be difficult and/or result in inefficiencies. For example, in order to achieve data sharing between one or more platforms, the enterprise may assign an in-house developer, or hire an outside developer (e.g., a contractor or a software development services company) to write scripts to facilitate the sharing of data between platforms. As the platforms update and evolve over time, the scripts may be correspondingly updated to account for the changes to the platforms.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques include configurable adapters that may be used in conjunction with middleware to share data between various platforms and/or applications without a user, developer, or IT agent writing one or more scripts to facilitate the sharing of data. Further, as various platforms and applications are updated, the configurable adapters and middleware may also dynamically update so a user does not have to spend time updating a script to work with the updated platforms/applications. Using configurable adapters and middleware, large complex frameworks of many platforms/applications may be designed to perform various functions of an enterprise or organization. For example, such a framework may be designed to pull or receive product information from various vendors or third parties, as well as promotional offers for those products. The product and offer data may be combined, processed, and listed in a product catalog, which users may use to shop for and order products or services. The configurable adapters and middleware may be used to allow platforms and/or applications used by the enterprise to share data about the order and create appropriate records (e.g., for book keeping, accounting, taxes, facilities, etc.). Accordingly, the use of configurable adapters and middleware may significantly reduce or even eliminate the amount of script writing and other software development done to create a complex framework of platforms and/or applications to perform complex tasks within an enterprise.

Various refinements of the features noted above may exist in relation to aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 4 is a screen shot from a configurable adapter set up screen, in accordance with an embodiment;

FIG. 5 is a screen shot of the configurable adapter set up screen of FIG. 4 when a priority field is selected, in accordance with an embodiment;

FIG. 6 is a screen shot of the configurable adapter set up screen of FIG. 4 when an impact field is selected, in accordance with an embodiment;

FIG. 8 is a screen shot of the configurable adapter set up screen of FIG. 4 when a platform field is selected, in accordance with an embodiment;

FIG. 9 is a screen shot of the configurable adapter set up screen of FIG. 4 when an application field is selected, in accordance with an embodiment;

FIG. 10 is a screen shot of a table selection window that opens when a table field is selected from the configurable adapter set up screen of FIG. 4, in accordance with an embodiment;

FIG. 11 is a screen shot of the configurable adapter set up screen of FIG. 4 when a map from field is selected, in accordance with an embodiment;

FIG. 12 is a screen shot of the configurable adapter set up screen of FIG. 4 when a destination tab is selected, in accordance with an embodiment;

FIG. 13 is a screen shot of the configurable adapter set up screen 400 of FIG. 12 when a destination platform field is selected, in accordance with an embodiment;

FIG. 16 is a screen shot of the configurable adapter set up screen of FIG. 4 when a middleware tab is selected, in accordance with an embodiment;

FIG. 17 is a screen shot of the configurable adapter set up screen of FIG. 16 when an adapter/messaging type field is selected, in accordance with an embodiment;

FIG. 18 is a screen shot of the configurable adapter set up screen of FIG. 16 when an infrastructure field is selected, in accordance with an embodiment;

FIG. 19 is a screen shot of the configurable adapter set up screen of FIG. 16 when an approvals tab is selected, in accordance with an embodiment;

FIG. 21 is a screen shot of the configurable adapter set up screen of FIG. 16 when a task activities tab is selected, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An Information Technology (IT) network of an enterprise may include a number of computing devices, server systems, databases, and the like that generate, collect, store, and distribute information in the normal operations of an enterprise or organization. The enterprise may utilize different platforms, applications, and/or software packages to perform different functions (e.g., human resources, pay roll, purchasing, asset procurement, information technology, accounting, tax, etc.). Some of these platforms, applications, and/or software packages may be provided by different vendors such that the platforms, applications, and/or software packages may not be set up to share data with one another. Accordingly, the enterprise may enlist a developer to write scripts (e.g., modules of software code) to facilitate the sharing of data between platforms, applications, and/or software packages. However, as the platforms, applications, and/or software packages are updated, the scripts may need to be correspondingly updated to ensure smooth communication of data between platforms. Configurable adapters that are set up by a user via a graphical user interface, as opposed to writing a script, may be used to control a middleware instance to facilitate the sharing of data between two or more platforms, applications, and/or software packages without writing or editing a script. Accordingly, configurable adapters and middleware instances may be used to build up large, complex frameworks of platforms, applications, and/or software packages capable of performing complex tasks for the enterprise.

Figure 1:
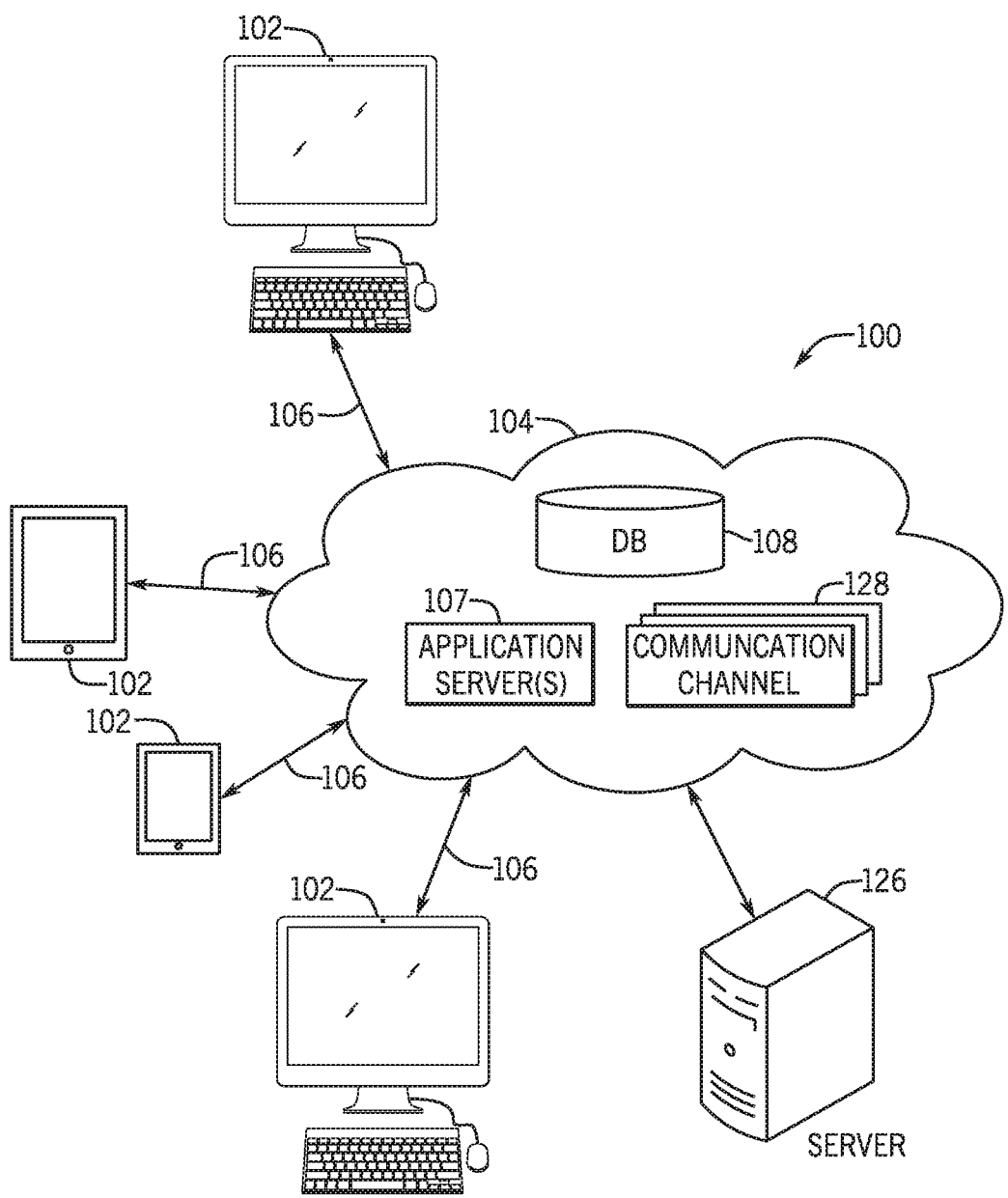
FIG. 1 is a block diagram of a distributed computing system utilizing a cloud service and a database, in accordance with an embodiment.

By way of introduction, FIG. 1 is a block diagram of a distributed computing system 100 that utilizes a distributed computing framework, which may perform one or more of the techniques described herein. As illustrated in FIG. 1, one or more clients 102 communicate with a platform 104 (e.g., a cloud service platform) over a communication channel 106. As shown, each client 102 may include any suitable computing system, such as a mobile phone, a tablet computer, a laptop computer, a notebook computer, a desktop computer, or any other suitable computing device or combination of computing devices. Each client 102 may include client multiple application programs capable of running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together and communicate using one or more networks. For instance, the platform 104 may be a cloud service platform that includes various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a few clients 102 are shown connected to the platform 104, it should be noted that the platform 104 may connect to many clients 102 (e.g., tens, hundreds, or thousands of clients).

Through the platform 104, the client 102 may connect to various devices with various functionalities, such as gateways, routers, load balancers, databases, application servers running application programs on one or more nodes, or other devices that may be accessed via the platform 104. For example, the client 102 may connect to application servers 107 and/or databases 108 via the platform 104. The application servers 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The platform 104 may include one or more database servers. The database servers are configured to store, manage, or otherwise provide data for delivering services to the client 102 over the communication channel 106. A database server may include one or more databases (e.g., DB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (DB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely, such as at a client site.

In the depicted topology, access to the platform 104 is enabled via a management, instrumentation, and discovery (MID) server 126 via a communication channel 128, such as an External Communications Channel (ECC) Queue. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the configuration items (CIs) being connected to the platform 104 on a common physical network.

The communication channel 128 may be a database table that is typically queried, updated, and inserted into by other systems. Each record in the communication channel 128 is a message from an instance in the platform 104 to a system (e.g., MID server 126) external to the platform 104 that connects to the platform 104 or a specific instance running in the platform 104 or a message to the instance from the external system. The fields of a communication channel 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message.

Although the system 100 is described as having the application servers 107, the DB 108, the communication channel 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
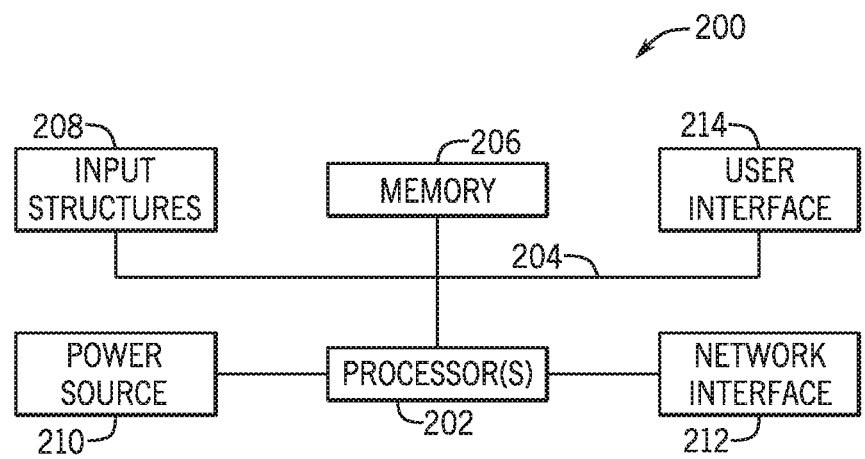
FIG. 2 is a block diagram of a generalized computing device utilized in the distributed computing system of FIG. 1, in accordance with an embodiment.

In any case, to perform one or more of the operations described herein, the client 102, the application server 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., DB 108), other servers in the platform 104 (e.g., server hosting the communication channel 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other suitable circuitry performing functions by executing instructions stored in the memory 206 or in an otherwise accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units of the same or different types in one or more physical locations. The one or more processor 202 may access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternatively or additionally include other input devices. For example, the input structures 208 may include sensors or detectors that monitor the computing device 200 or an environment around the computing device 200. For example, a computing device 200 can contain a geospatial device, such as a global positioning system (GPS) location unit.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. In addition and/or alternative to the display, the user interface 214 may include other devices for interfacing with a user.

Figure 3:
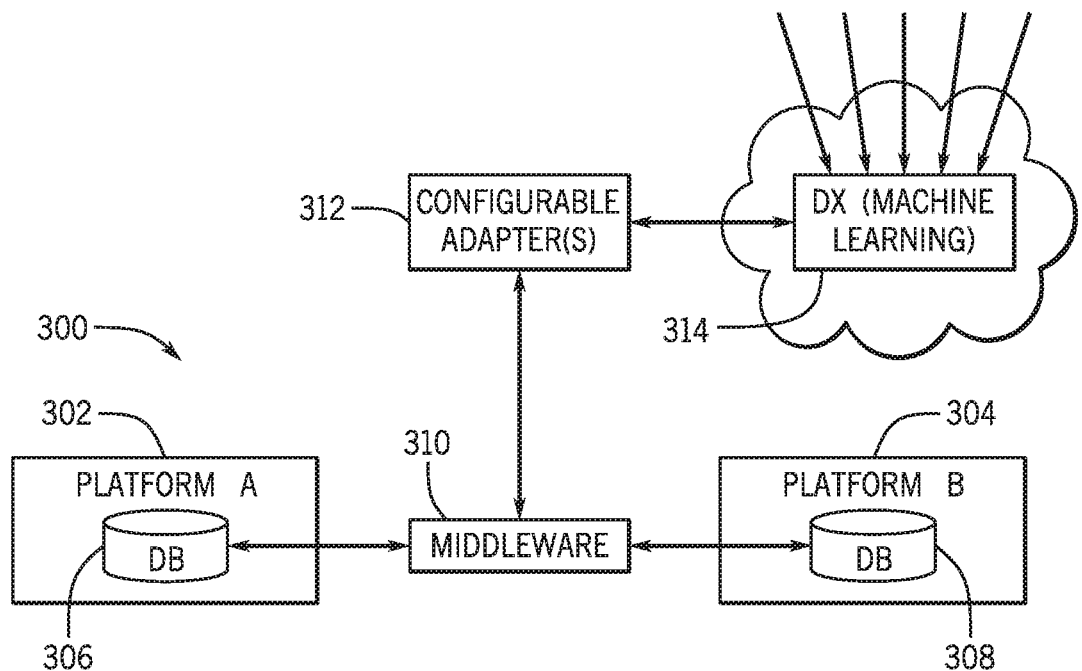
FIG. 3 is a block diagram of an embodiment of a system for exchanging data between two or more platforms, in accordance with an embodiment.

FIG. 3 is a block diagram of an embodiment of a system 300 for exchanging data between platforms 302, 304. The system 300 may implemented, for example, within the distributed computing system of FIG. 1. As previously described, an enterprise may utilize multiple different platforms 302, 304 in order to run the enterprise more efficiently. For example, the enterprise may use platform A 302 for financial record keeping, and use platform B as a human resources (HR) web portal for employees to access email, manage health benefits, 401(k) contributions, etc. For the sake of clarity and simplicity, only two platforms 302, 304 are shown in FIG. 3, however, it should be understood that an enterprise may utilize many more platforms in the operation of their enterprise. Each platform 302, 304 may include one or more DBs 306, 308, which may store one or more tables. In some cases, it may be beneficial to share data between platforms 302, 304. For example, in the above example, platform A 302 may wish to pull data from platform B regarding how much was paid out to employees via payroll and how much was spent on health benefits and 401(k) contributions. In such an embodiment, one or more middleware instances 310 (e.g., middleware components) may act as an interface between the platforms 302, 304, locating the desired data within the source DB 308, copying the data from the source DB 308, in some cases reformatting the data, and pushing the data to the destination DB 306. The data may then be used by platform A 302 to generate financial reports, or otherwise perform financial analysis.

Typically, the middleware 310 is configured via a script or some other piece(s) of code. The script may be written by an in-house developer or IT specialist, or the script writing may be outsourced to an outside developer (e.g., a contractor or a software development services company). In addition to requiring specialized knowledge of software code, writing the script consumes resources that the enterprise could reallocate to other tasks. Enterprises around the world may devote resources to writing similar scripts to perform the same or similar tasks, resulting in redundancies and inefficiencies. Further, as the platforms update and evolve over time, the scripts will need to be updated accordingly, or risk not working properly, if at all.

In the illustrated embodiment, one or more configurable adapters 312 may be used to configure the middleware 310, eliminating the need for a script. Accordingly, the configurable adapters 312 enable a person without the specialized knowledge of software development to configure the middleware 310. The configurable adapters 312 may be accessible via a user interface (e.g., via a web browser or an application) of a computing device (e.g., one of the clients shown in FIG. 1).

In some embodiments the configurable adapters 312 may be in communication with a machine learning component, such as DX Continuum (DX) 314. The DX 314 may be stored in the cloud (e.g., a distributed computing system), on a remote server, or on an on-premises server ("on prem"). The DX 314 may collect data from multiple customers over time and utilize machine learning (e.g., a trained neural network) to develop a library of rules and/or combinations of adapters, platforms 302, 304, middleware 310, and/or infrastructure combinations. As a user is using the configurable adapters 312 to configure the platforms 302, 304 and middleware 310 combinations, the DX 314 may make suggestions as to how the user should set the system up, or approve a configuration that the user has set up.

A user may set up the configurable adapters 312 via the user interface of a computing device, such as a desktop computer, a laptop computer, a notebook computer, a tablet computer, a mobile phone, or some other computing device. FIG. 4 is a screen capture from a configurable adapter set up screen 400. As shown, the configurable adapter set up screen 400 includes a top window 402 that includes various information corresponding to the configurable adapter. For example, in the illustrated embodiment, the top window 402 includes fields for configurable adapter number 404, priority 406, impact 408, expected start date and time 410 expected end data and time 412, state 414, frequency 416, and data override 418. In some embodiments, the top window 402 may include a check box to indicate whether or not the configurable adapter is active.

A row of tabs, including a data source tab 420, a destination tab 422, a middleware tab 424, and an approvals tab 426 control what is displayed in a middle window 428. When the data source tab 420 is selected, the fields displayed in the middle window 428 may include, for example, source platform 430, source platform new URL 432, source application 434, source application URL 436, authentication use name 438, authentication password 440, source table 442, and source map from field 444. The fields displayed when other tabs are selected are described below.

Another row of tabs, including an approvers tab 446, an events tab 448, and a task activities tab 450 control what is displayed in a bottom window 452. In the illustrated embodiment, the approvers tab 446 is selected, so the bottom window shows that approval has been requested for the current configurable adapter and is currently pending.

Returning to the configurable adapter number field 404, in the top window 402, the configurable adapter number is entered by the user. The configurable adapter number may be, for example, an alpha-numeric character string that corresponds to the configurable adapter.

Figure 5:
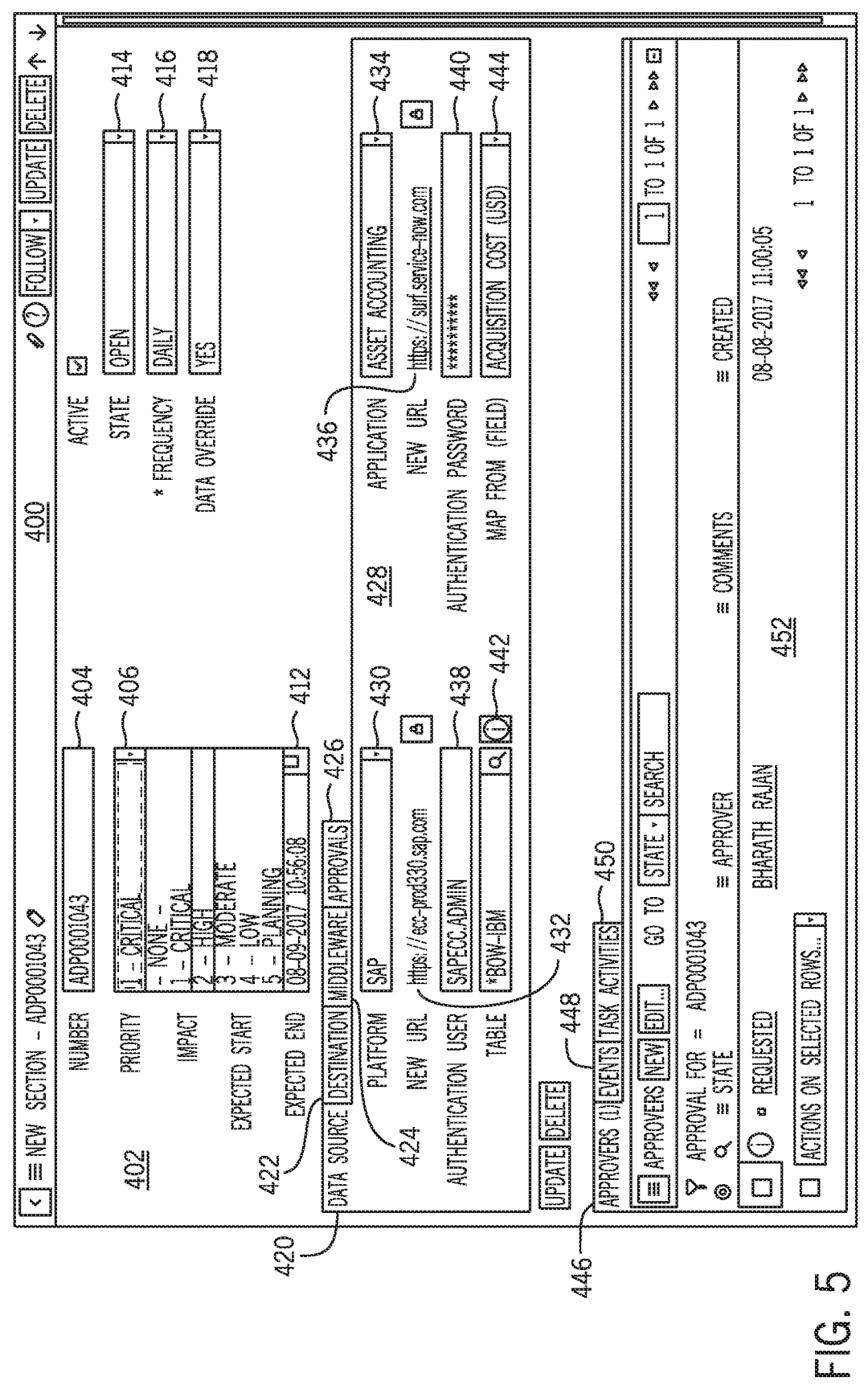

In the illustrated embodiment, the priority field 406 is filled by selecting an option from a drop-down menu. FIG. 5 is a screen shot of the configurable adapter set up screen 400 of FIG. 4 when the priority field 406 is selected. As shown, the user may select from options of "None", "1—Critical", "2—High", "3—Moderate", "4—Low", and "5—planning". In some embodiments, times of limited resources (e.g., bandwidth), data exchanges may be prioritized based on a designated priority of the operations.

Figure 6:
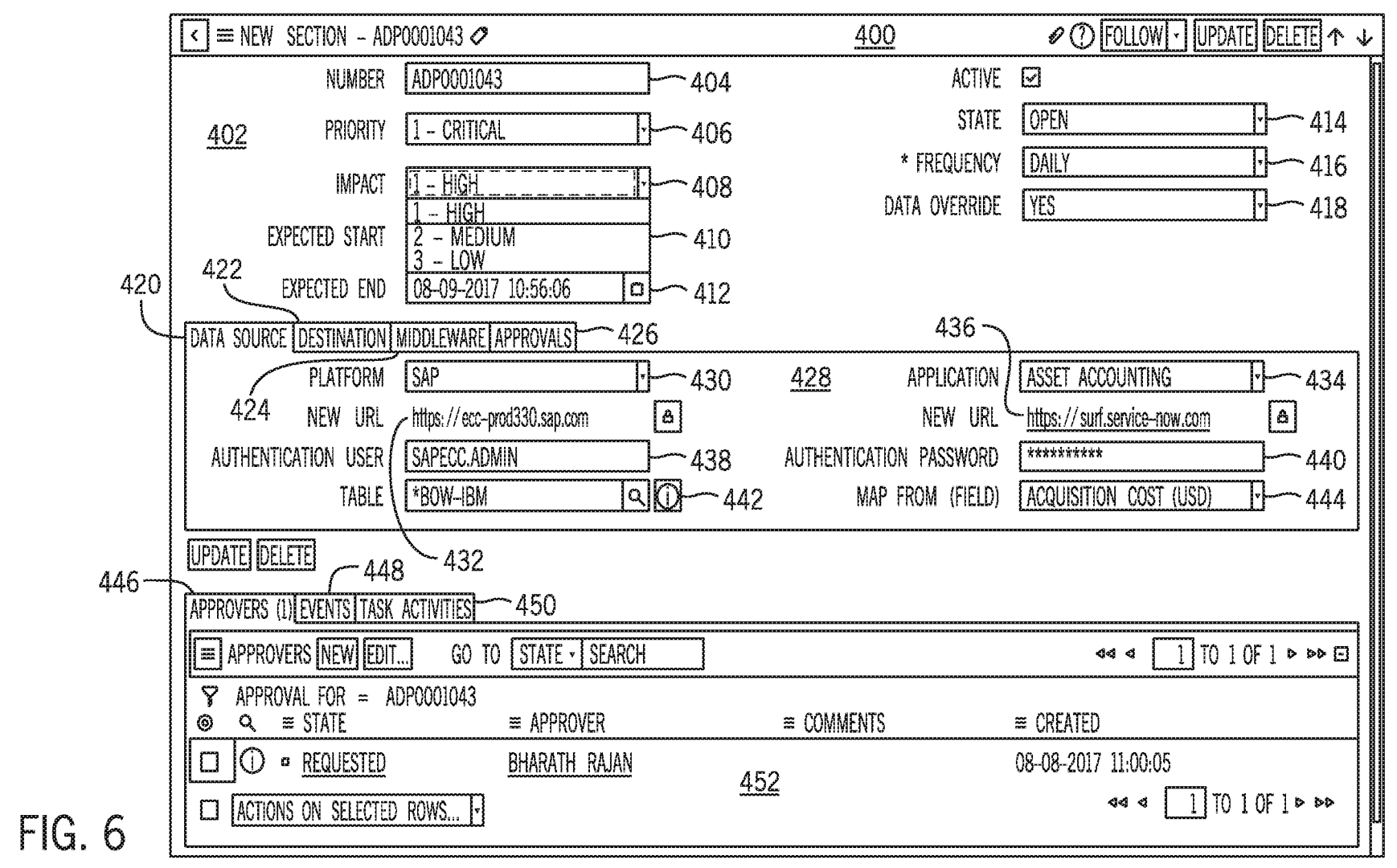

FIG. 6 is a screen shot of the configurable adapter set up screen 400 of FIG. 4 when the impact field 408 is selected. The impact field 408 is filled by selecting an option from a drop-down menu. As shown, the user may select from options of "1—High", "2—Medium", and "3—Low".

Returning to FIG. 4, the expected start field 410 and expected end field 412 may be filled in be the user. The expected start field 410 may specify, for example the date and time of the first data exchange. The expected end field 412 may specify, for example the date and time that the data exchange stops, or for the date and time of the last exchange. For each field 410, 412, the user may manually fill in a date and time, or selecting the field may cause a window to open that allows the user to cycle through a calendar and/or clock to select start and end dates and times.

Figure 7:
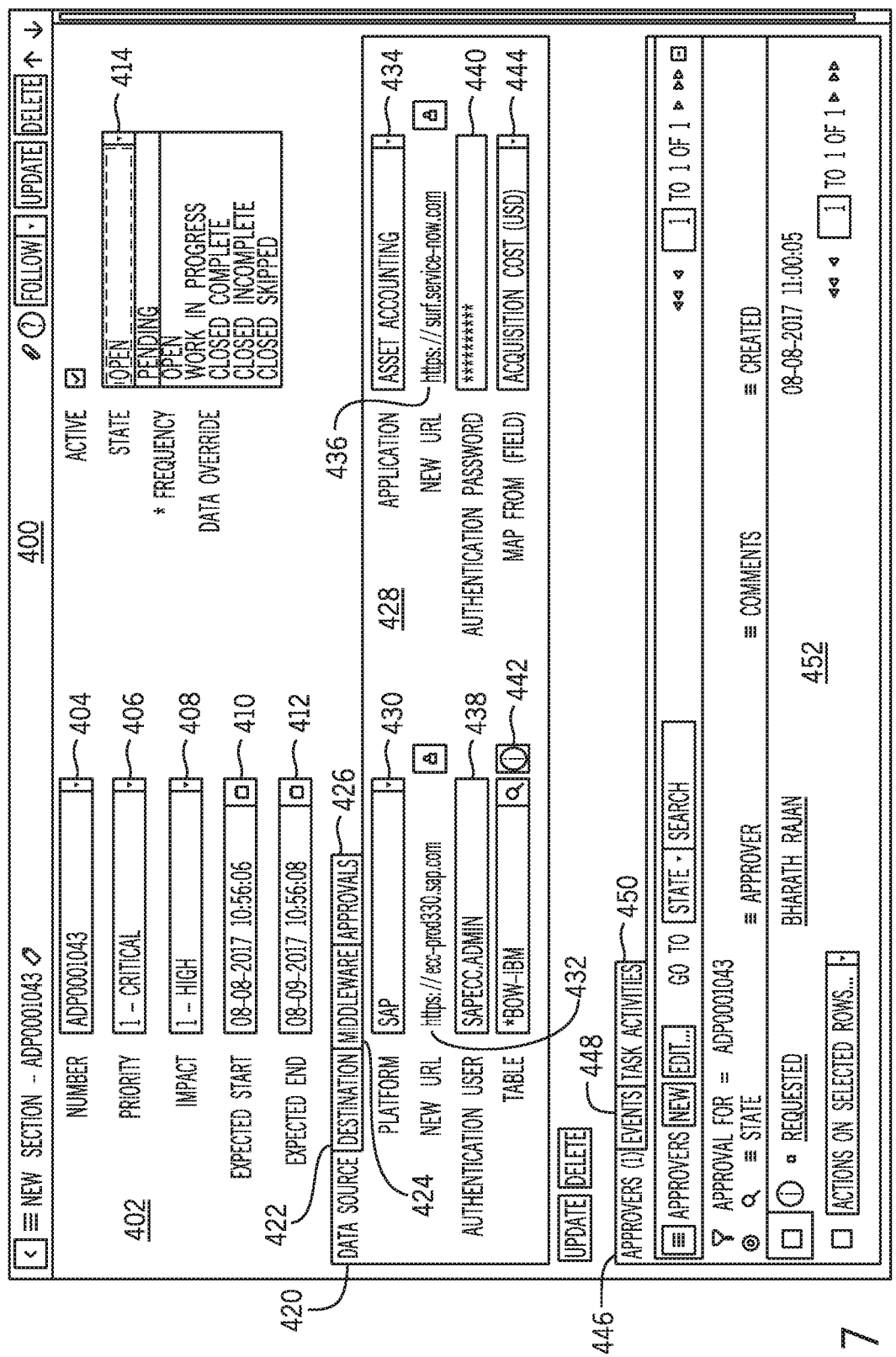
FIG. 7 is a screen shot of the configurable adapter set up screen of FIG. 4 when a state field is selected, in accordance with an embodiment.

The state field 414 is filled by selecting an option from a drop-down menu. FIG. 7 is a screen shot of the configurable adapter set up screen 400 of FIG. 4 when the state field 414 is selected. As shown, the user may select from options of "Pending", "Open", "Work in Progress", "Closed Complete", "Closed Incomplete", and "Closed Skipped". "Pending" indicates that the configurable adapter has been set up, but is pending approval. "Open" indicates that the configurable adapter has been set up, approved, and is being used. "Work in Progress" indicates that the configurable adapter is in the process of being set up. "Closed Complete" indicates that the configurable adapter has been set up, approved, that the expected end date has passed, and that the configurable adapter's operations have been successfully completed. "Closed Incomplete" indicates that the configurable adapter was set up, approved, and attempted to exchange data, but was unable to complete the data exchange. "Closed Skipped" indicates that the configurable adapter was set up, and approved, but for some reason was unable to start the data exchange, so the data exchange was skipped.

Returning to FIG. 4, the frequency field 416 is filled by selecting an option from a drop-down menu. The options may include, for example, hourly, daily, weekly, monthly, quarterly, annually, etc. In some embodiments, the use may select an "other" option and enter a frequency option that is not in the drop down menu (e.g., every three days, every two weeks, etc.).

The data override field 418 is also filled by selecting an option from a drop-down menu. The options for the data override field are simply "yes" and "no". If "yes" is selected, the data from the source table will override the data in the same field of the destination table. If "no" is selected, the data from the source table will be copied to the destination table by creating an adjacent duplicate field with the new data. In other embodiments, data override may be specified by other means, such as a check box.

Figure 8:
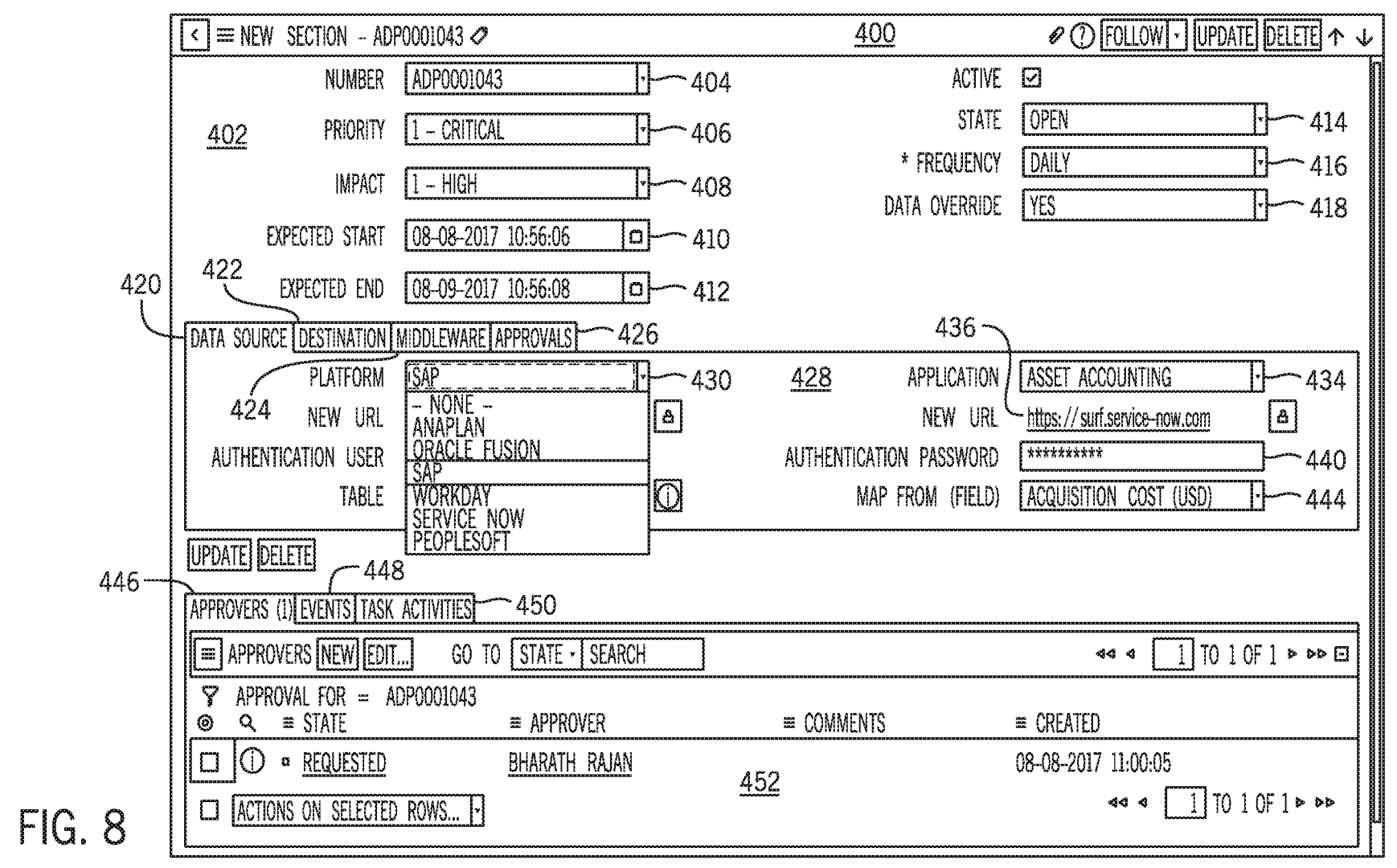

Transitioning now to the middle window 428, as previously discussed, because the data source tab 420 is selected, the middle window 428 displays information corresponding to the source of the data. The platform field 430 is filled by selecting an option from a drop-down menu. FIG. 8 is a screen shot of the configurable adapter set up screen 400 of FIG. 4 when the platform field 430 is selected. As shown, the user may select from options of ANAPLAN®, ORACLE FUSION®, SAP®, WORKDAY®, SERVICENOW®, and PEOPLESOFT®. It should be understood, however, that other platforms may be available. Returning to FIG. 4, once the platform field 430 is selected, the new platform URL field 432 is filled in. The new platform URL field 432 may be manually completed by the user, or automatically filled in.

Figure 9:
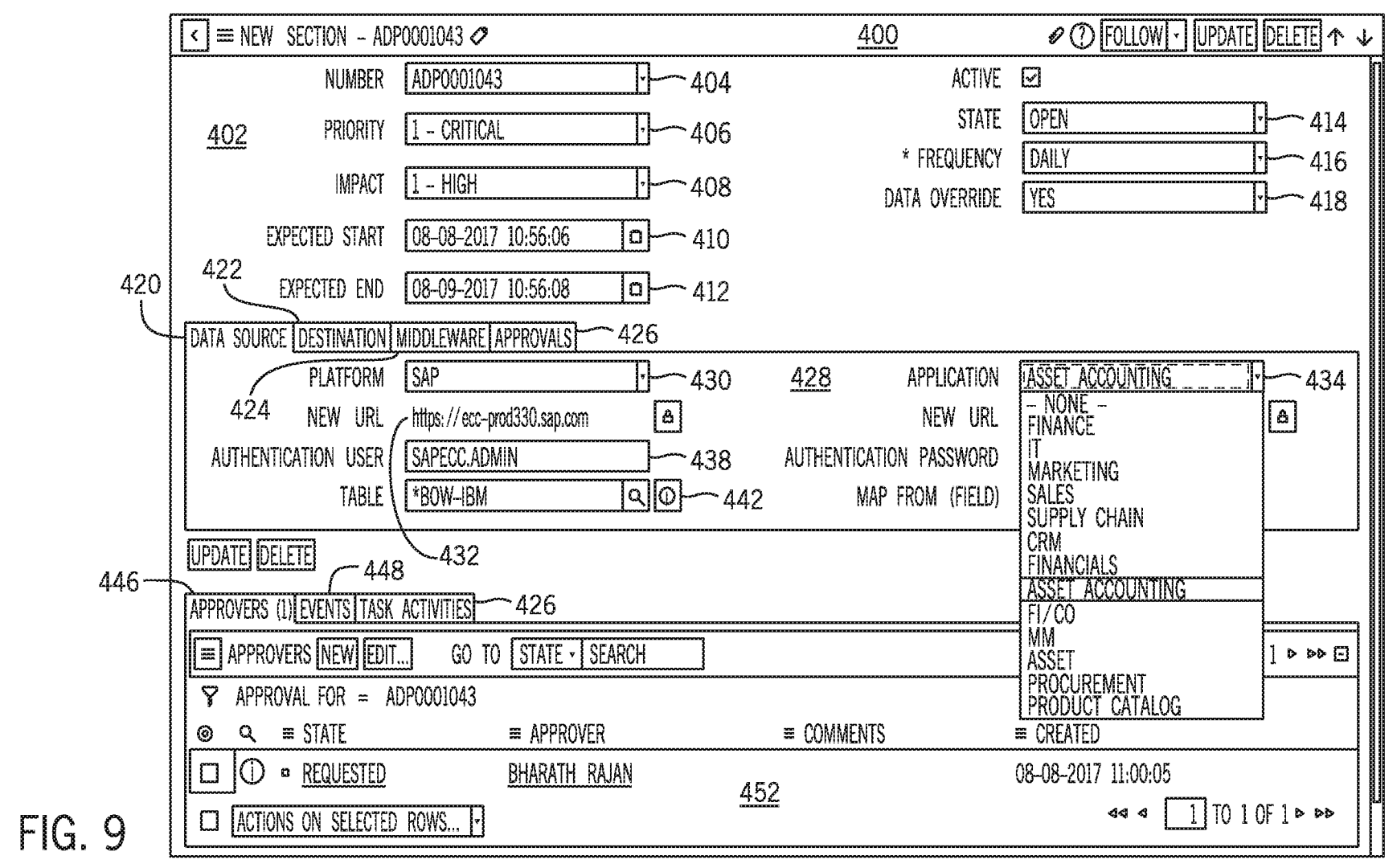

FIG. 9 is a screen shot of the configurable adapter set up screen 400 of FIG. 4 when the application field 434 is selected. The application field 434 is filled by selecting an option from a drop-down menu. As shown, the user may select from options of "Finance", "IT", "Marketing", "Sales", "Supply Chain", "CRM", "Financials", "Asset Accounting", "FI/CO", "MM", "Asset", "Procurement", "Product Catalog", etc. However, it should be understood that application options may be dependent upon the selected platform. Returning to FIG. 4, once the application field 434 is selected, the new application URL field 436 is filled in. As with the new platform URL field 432, the new application URL field 436 may be manually completed by the user, or automatically filled in.

Figure 11:
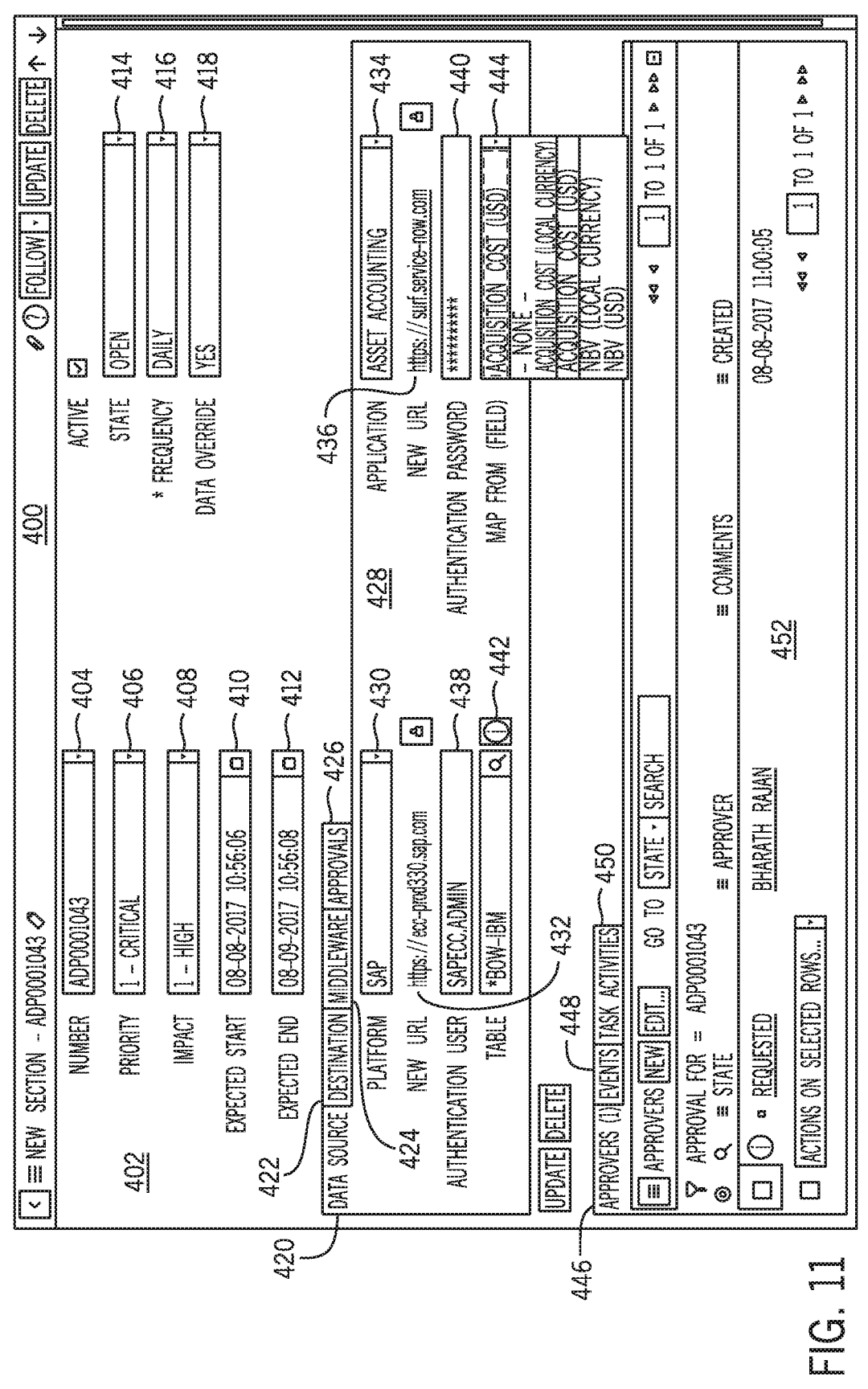

Once the platform field 430 and application field 434 have been filled in, the user manually enters his or her username and password for the source application into the respective username and password fields 438, 440. In other embodiments, the user may provide biometric information (e.g., fingerprint, retina, facial data, voice data, etc.) as authentication or use other suitable authentication criteria. To fill in the table field 442, the user selects the table field 442, which causes a table selection window to open. FIG. 10 is a screenshot of the table selection window 500 that opens when the user selects the table field. As shown, the table selection window 500 includes a listing of multiple possible tables. Upon the user's selection of one of the listed tables, the table window may close and the name of the selected table may be listed in the table field. Once a table has been selected, the user may fill in the map field. FIG. 11 is a screen shot of the configurable adapter set up screen 400 of FIG. 4 when the map from field 444 is selected. In the illustrated embodiments, the options for the map from field 444 include "acquisition cost (local currency)", "acquisition cost (USD)", "NBV (local currency", and "NBV(USD)" because these are fields from the selected table, "*BOW-IBM". However, if a different table is selected, the options for the map from field 444 will correspond to the fields of the selected table. The map from field 444 is the field from which data will be pulled and pushed to the destination location.

Figure 12:
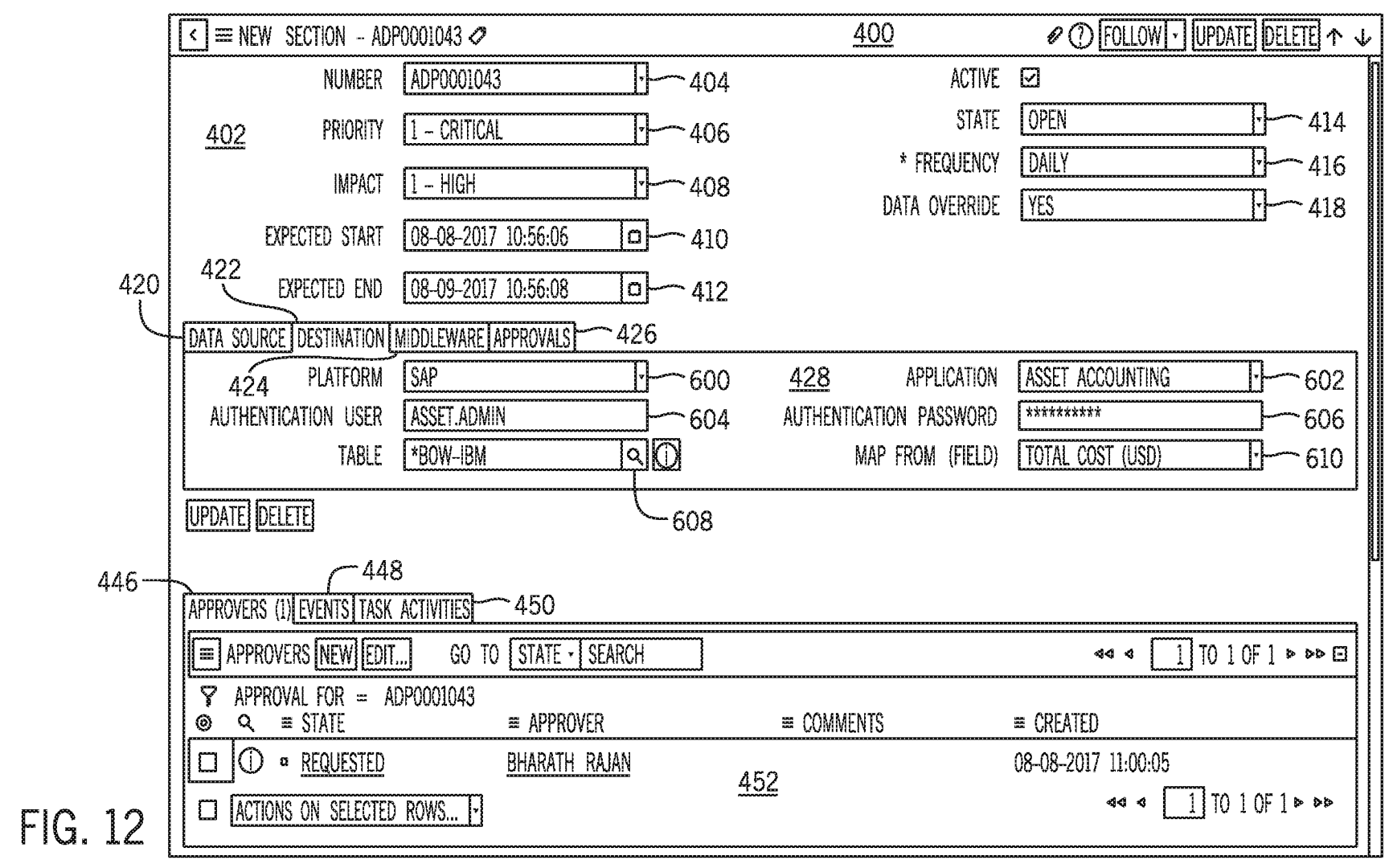

When the destination tab 422 is selected, the middle window 428 is populated with information corresponding to the destination of the information. FIG. 12 is a screenshot of the configurable adapter set up screen 400 of FIG. 4 when the destination tab 422 is selected. As the name suggests, the destination is the location to which data pushed or pulled from the data source is directed. As shown, when the destination tab 422 is selected, the fields displayed in the middle window 428 may include, for example, destination platform 600, destination application 602, authentication use name 604, authentication password 606, destination table 608, and source map to field 610.

Figure 13:
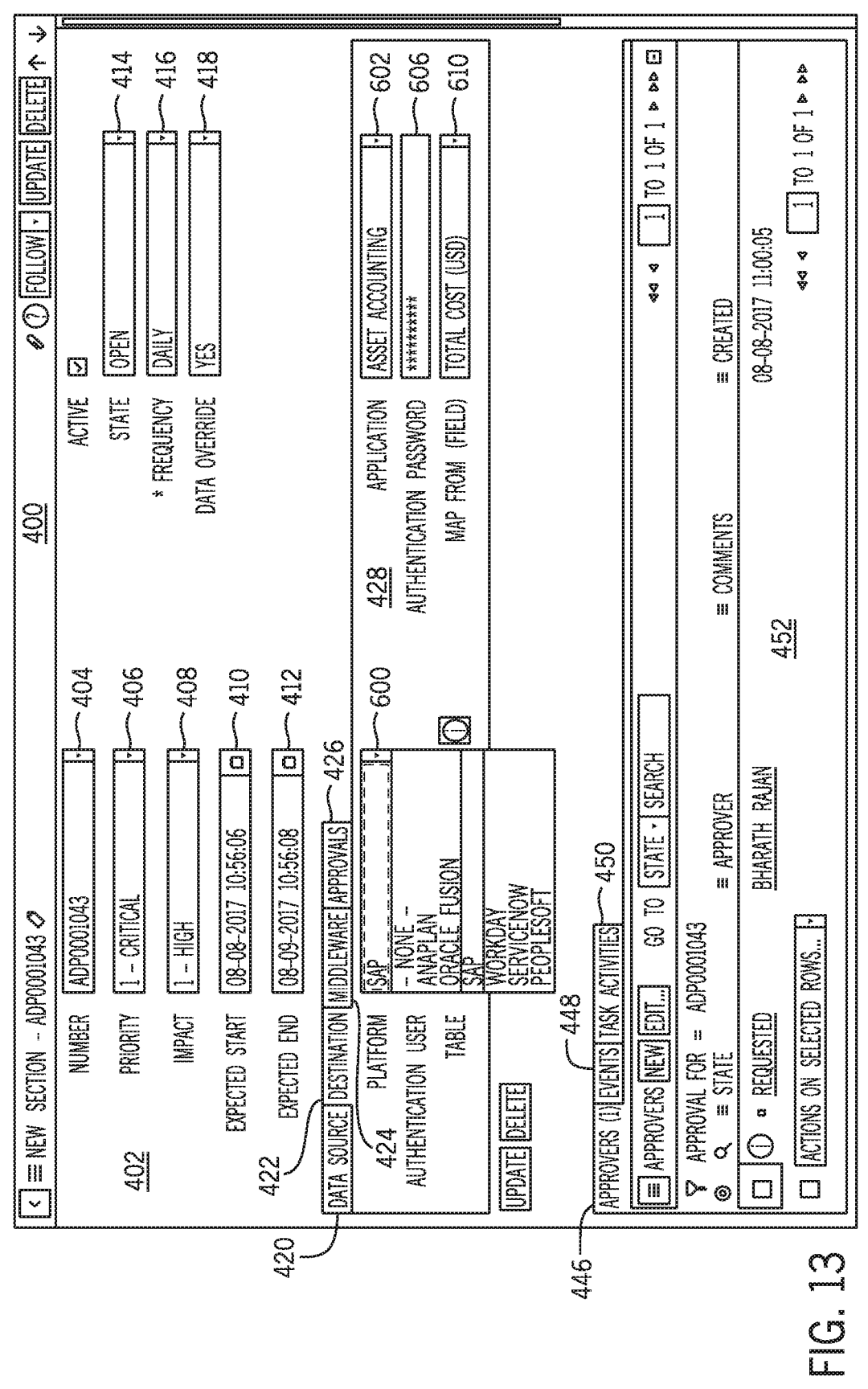

The destination platform field 600 is filled by selecting an option from a drop-down menu. FIG. 13 is a screen shot of the configurable adapter set up screen 400 of FIG. 12 when the destination platform field 600 is selected. As shown, the user may select from options of ANAPLAN®, ORACLE FUSION®, SAP®, WORKDAY®, SERVICENOW®, and PEOPLESOFT®. It should be understood, however, that other platforms may be available.

Figure 14:
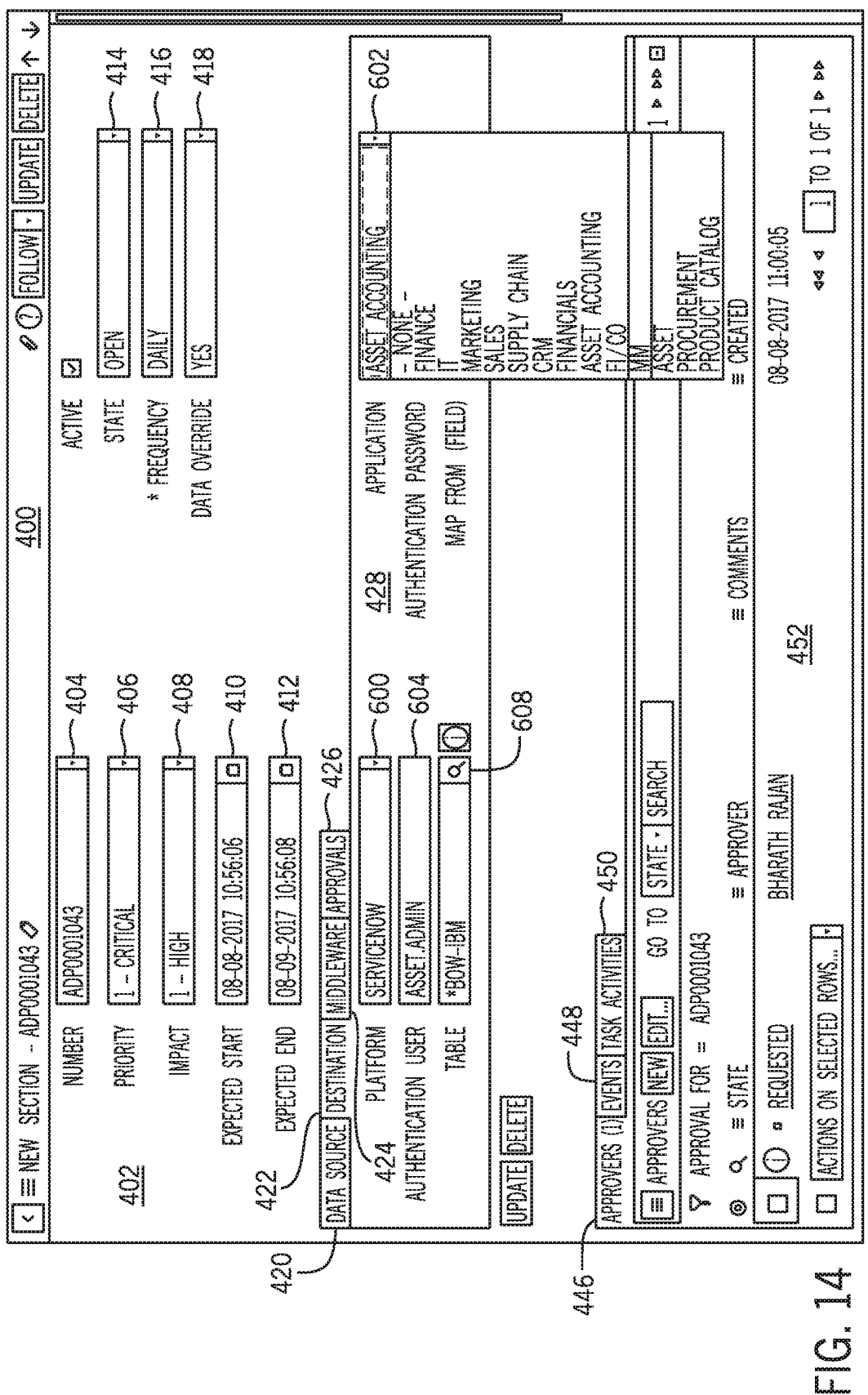
FIG. 14 is a screen shot of the configurable adapter set up screen of FIG. 12 when a destination application field is selected, in accordance with an embodiment.
Figure 15:
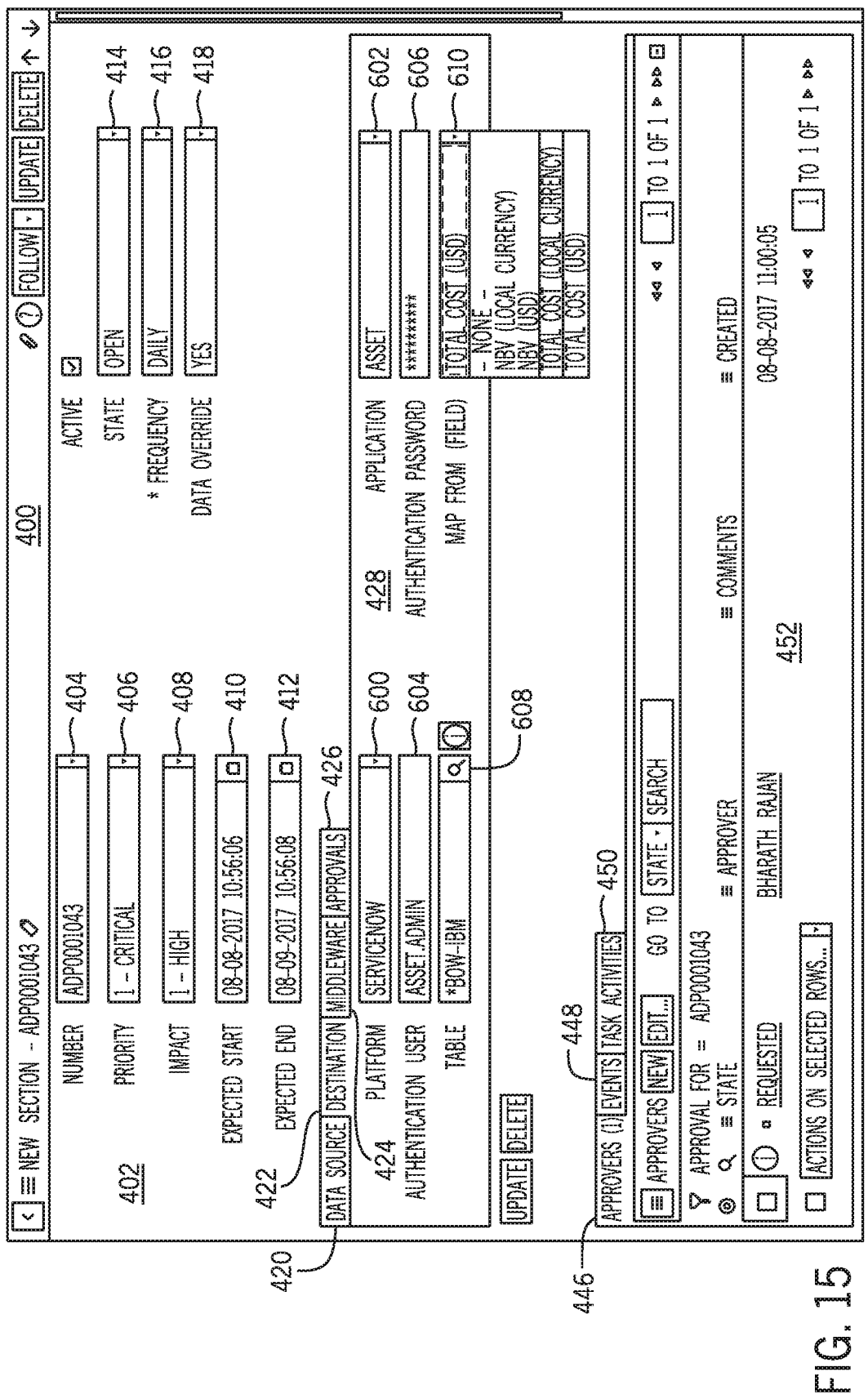
FIG. 15 is a screen shot of the configurable adapter set up screen of FIG. 12 when a map to field is selected, in accordance with an embodiment.

FIG. 14 is a screen shot of the configurable adapter set up screen 400 of FIG. 12 when the destination application field 602 is selected. The destination application field 602 is filled by selecting an option from a drop-down menu. As shown, the user may select from options of "Finance", "IT", "Marketing", "Sales", "Supply Chain", "CRM", "Financials", "Asset Accounting", "FI/CO", "MM", "Asset", "Procurement", "Product Catalog", etc. However, the applications options may be dependent upon the platform selected. Returning to FIG. 12, once the destination application field 602 is selected, the user manually enters his or her username and password for the destination application into the respective username and password fields 604, 606. To fill in the destination table field 608, the user selects the destination table field 608, which causes the table selection window 500 to open, as previously shown and described with regard to FIG. 10. Upon the user's selection of one of the listed tables, the table window may close and the name of the selected table may be listed in the table field. Once a table has been selected, the user may fill in the map to field 610. FIG. 15 is a screen shot of the configurable adapter set up screen 400 of FIG. 12 when the map to field 610 is selected. In the illustrated embodiments, the options for the map to field 610 include "NBV (local currency)", "NBV (USD)", "Total Cost (local currency)", and "Total Cost (USD)" because these are fields from the selected destination table, "*BOW-IBM". However, if a different table is selected, the options for the map to field 610 will correspond to the fields of the selected table. The map to field 602 is the field to which data from the source location will be pulled and/or pushed.

Figure 16:
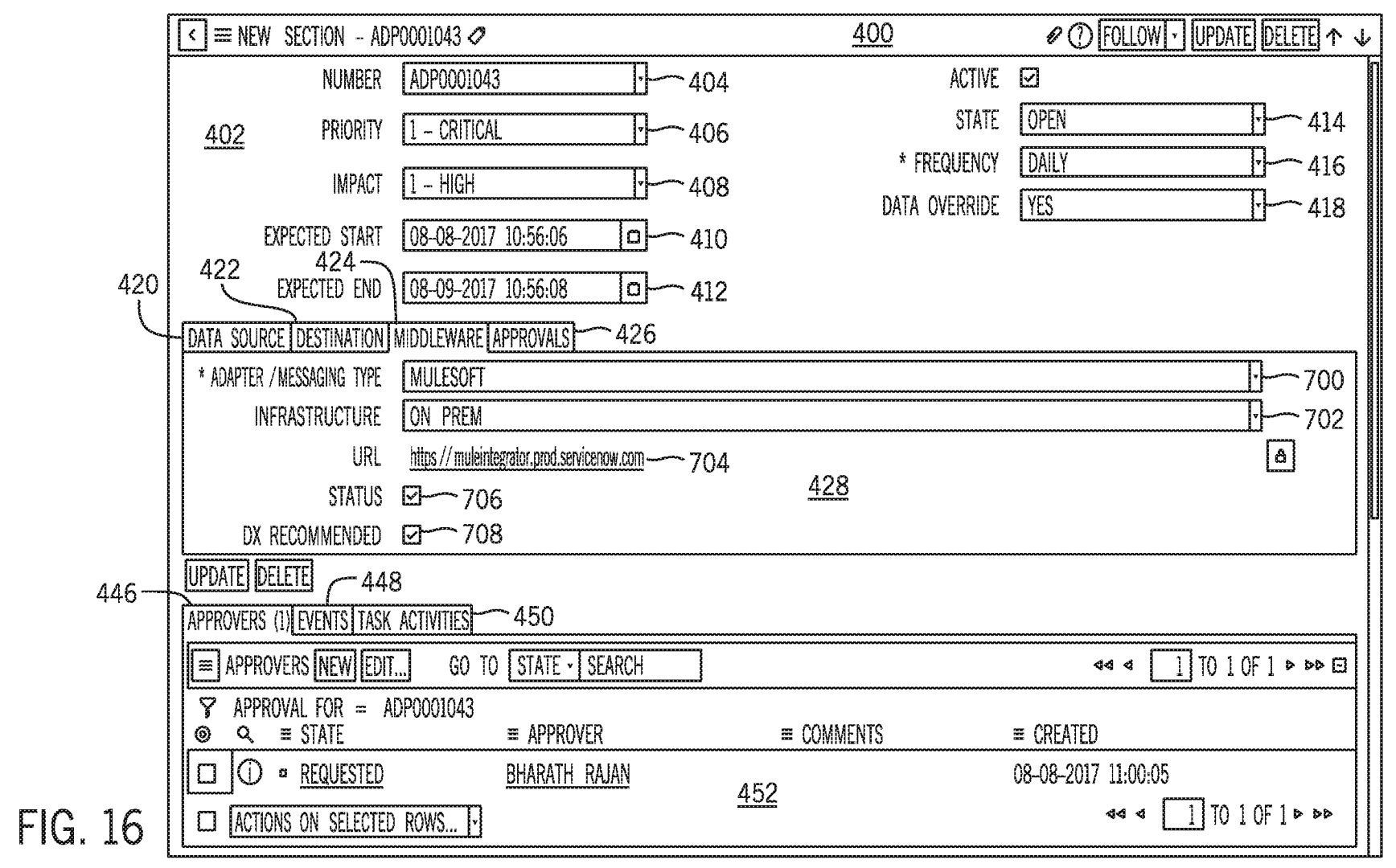

When the middleware tab 424 is selected, the middle window 428 is populated with information corresponding to the middleware used to pull and/or push data from the source to the destination. FIG. 16 is a screenshot of the configurable adapter set up screen 400 of FIG. 4 when the middleware tab 424 is selected. As shown, when the middleware tab 424 is selected, the fields displayed in the middle window 428 may include, for example, adapter/messaging type 700, infrastructure 702, URL 704, status 706, and DX recommended 708.

The adapter/messaging type field 700 is filled by selecting an option from a drop-down menu. FIG. 17 is a screen shot of the configurable adapter set up screen 400 of FIG. 16 when the adapter/messaging type field 700 is selected. As shown, the user may select from options of JSON, MID Server, MULESOFT®, REST, and SOAP. It should be understood, however, that other middleware options may be available. Middleware may be leveraged to transport data across platforms and can be hosted in the cloud on a server on the premises ("on prem"). In some embodiments, the middleware may be automatically selected, or a recommended middleware may be pre-selected.

Figure 18:
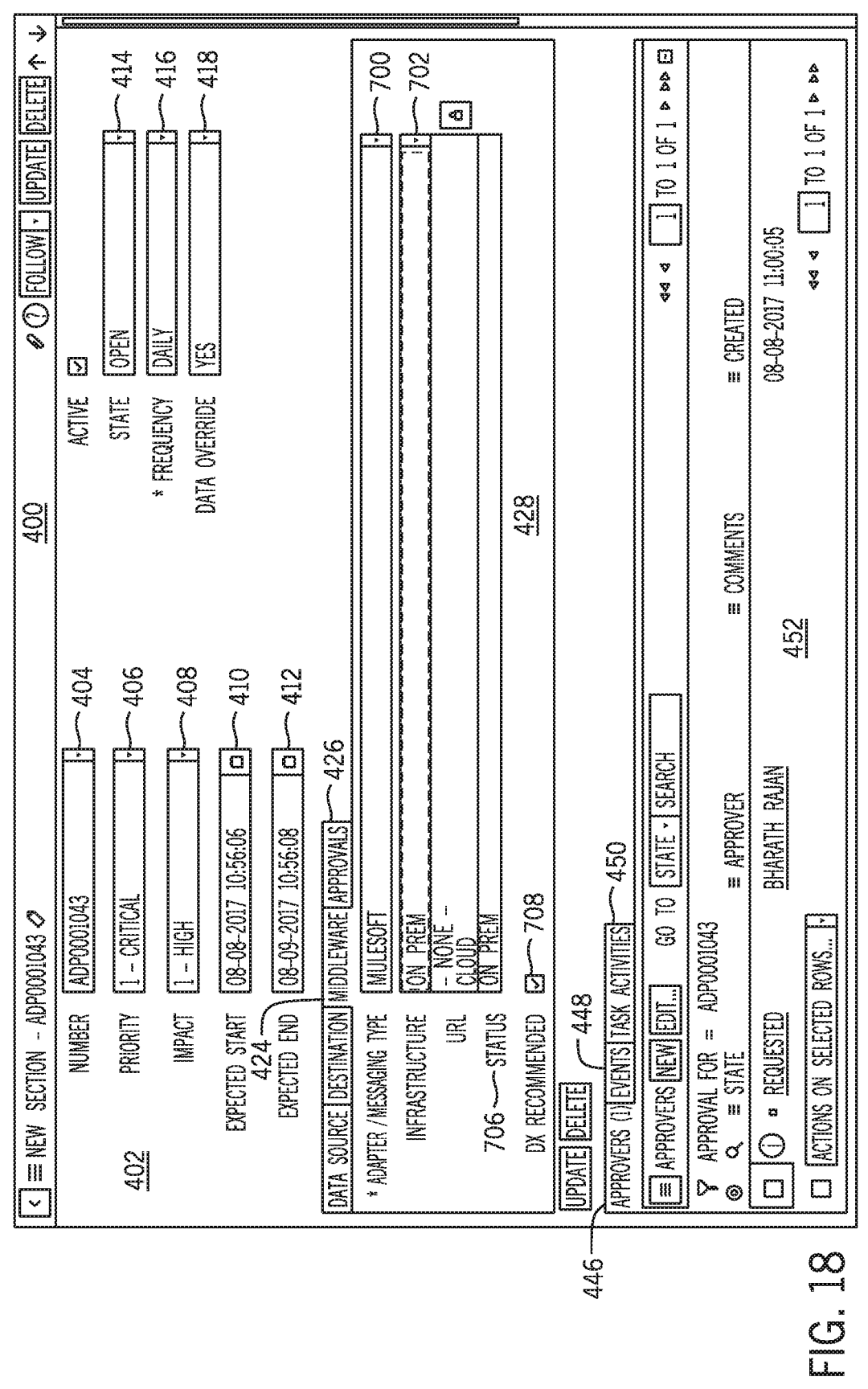

FIG. 18 is a screen shot of the configurable adapter set up screen 400 of FIG. 16 when the infrastructure field 702 is selected. The infrastructure field 702 is filled by selecting an option from a drop-down menu. As shown, the user may select "Cloud", or "On Prem". Selecting "Cloud" indicates that the middleware is running on a cloud-based server. Selecting "On Prem" indicates that the middleware is running on a local, on premises, server.

Returning to FIG. 16, once the adapter/messaging type and infrastructure fields have been filled in, user manually enters the URL of the middleware into the middleware URL field 704. As shown, the status field 706 and DX recommended field 708 are represented by check boxes. The user checks the status field 706 if the middleware is operational and leaves the status field 706 checkbox blank if the middleware is not operational. Similarly, the DX recommended field 708 check box is checked if the adapter/infrastructure is recommended by the DX and left unchecked if adapter/infrastructure is not recommended by the DX.

Figure 19:
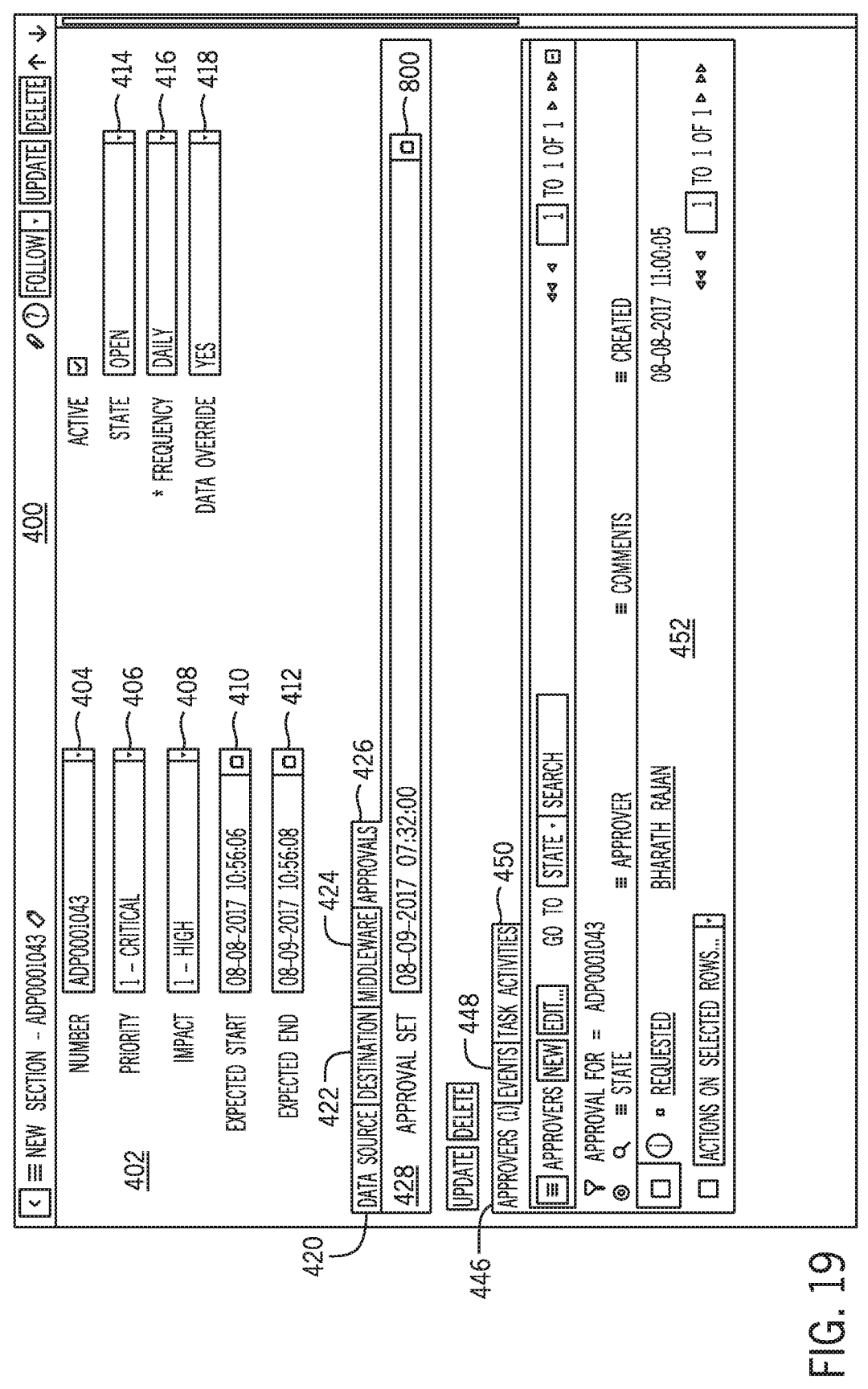

FIG. 19 is a screen shot of the configurable adapter set up screen 400 of FIG. 16 when the approvals tab 426 is selected. When the Approvals tab 426 is selected, the middle window 428 displays an approvals set field 800 that shows the date and time that approvals were set or will be set. The approvals set field 800 may be auto-filled based on when approvals were requested and approved.

When the approvers tab 446 is selected, the bottom window 452 displays the people who approve the configurable adapters. As shown, a table may be displayed with a record for each approver. The record may include, for example, the approvers name, the status of the approval request (requested, approved, denied, etc.), any comments provided by the approver or the requester, and a date/time that the request was created. A user may use this portion of the configurable adapter set up screen 400 to add new approvers, remove approvers, or edit existing approvers.

Figure 20:
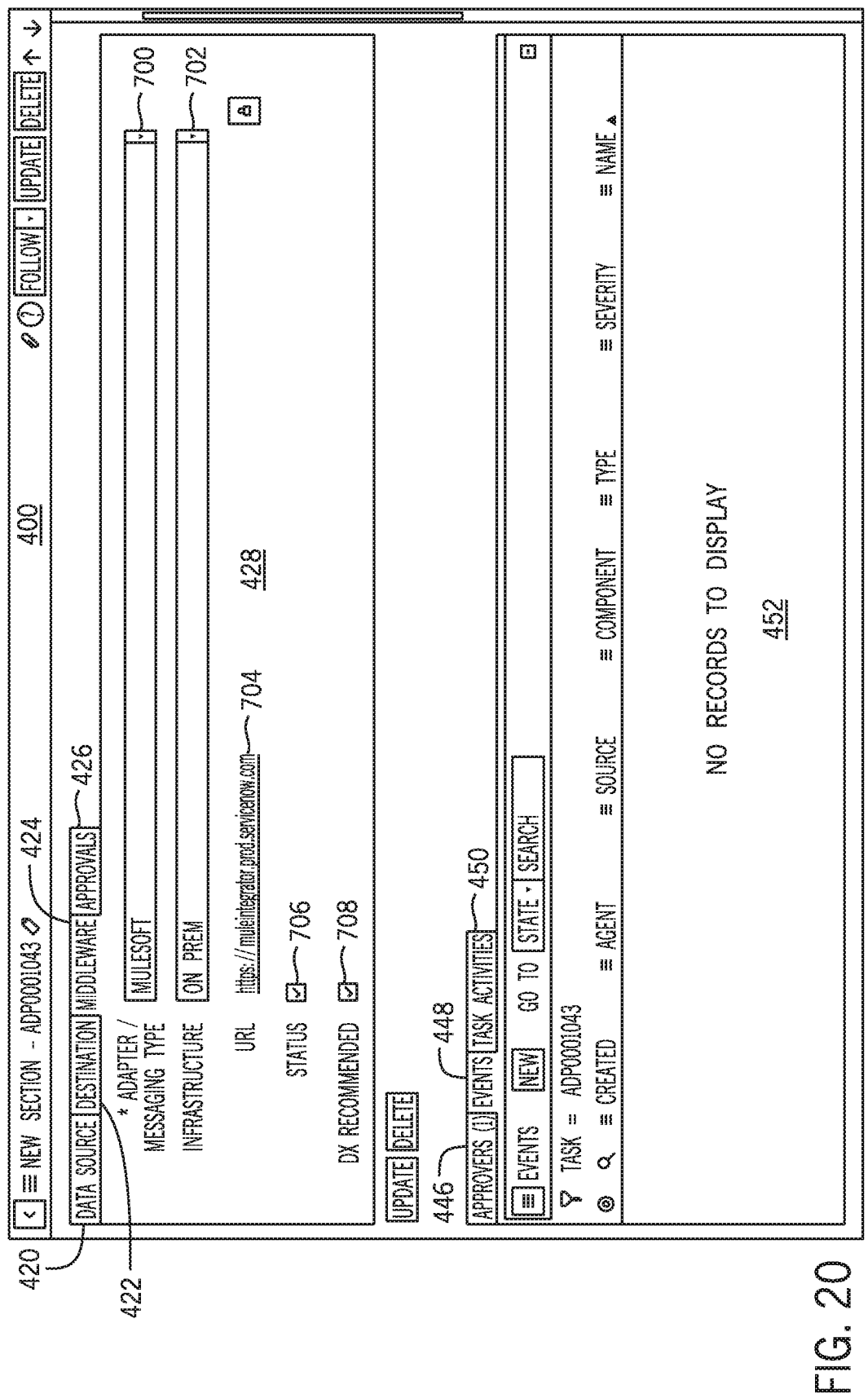
FIG. 20 is a screen shot of the configurable adapter set up screen of FIG. 16 when an events tab is selected, in accordance with an embodiment.

FIG. 20 shows the configurable adapter set up screen 400 of FIG. 16 when the events tab 448 is selected. Events are messages generated by network management and/or maintenance systems communicating errors, warnings, status updates, or suggestions. In some embodiments, the user may set up specific triggering events to generate an event that shows up in the bottom window. Though no events are shown in FIG. 20, when messages are received, records corresponding to the error or warning messages may be displayed in the bottom window 452. Such records may include, for example, the date and time created, the corresponding agent, the source, the component, the type, the severity, the name, etc. If the listed events are suggestions, the user may accept or reject the suggestions.

Figure 21:
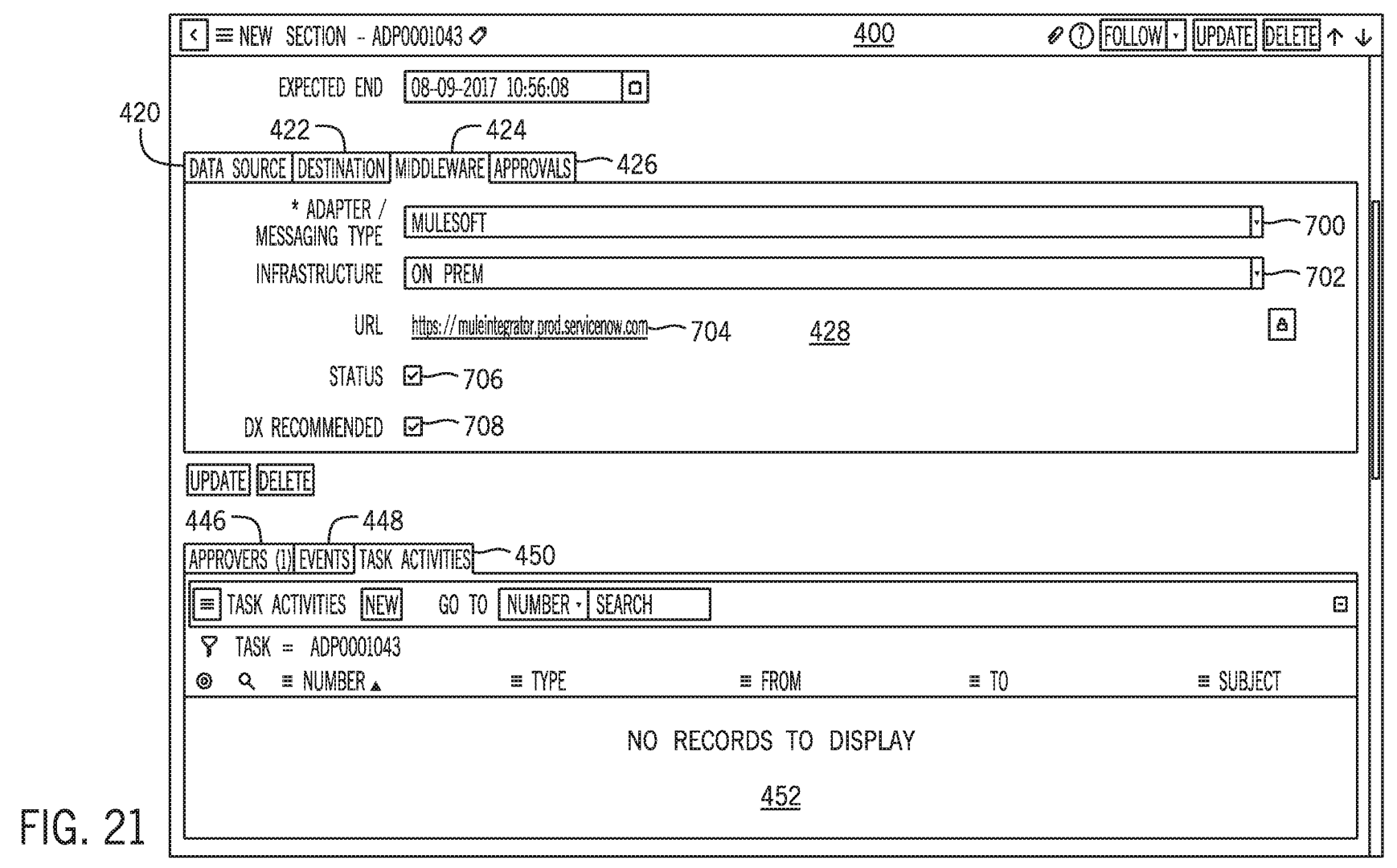

FIG. 21 shows the configurable adapter set up screen 400 of FIG. 16 when the task activities tab 450 is selected. Task activities may include specific instances in which data is pulled from a source and pushed to a destination and/or when the configurable adapter is updated or configured. Though no task activities are shown in FIG. 21, when the configurable adapter pulls data from a source and provides it to a destination, a record may be created and displayed in the bottom window 452. The record may include, for example, task number, task type, the source, the destination, information about the data, etc.

Figure 22:
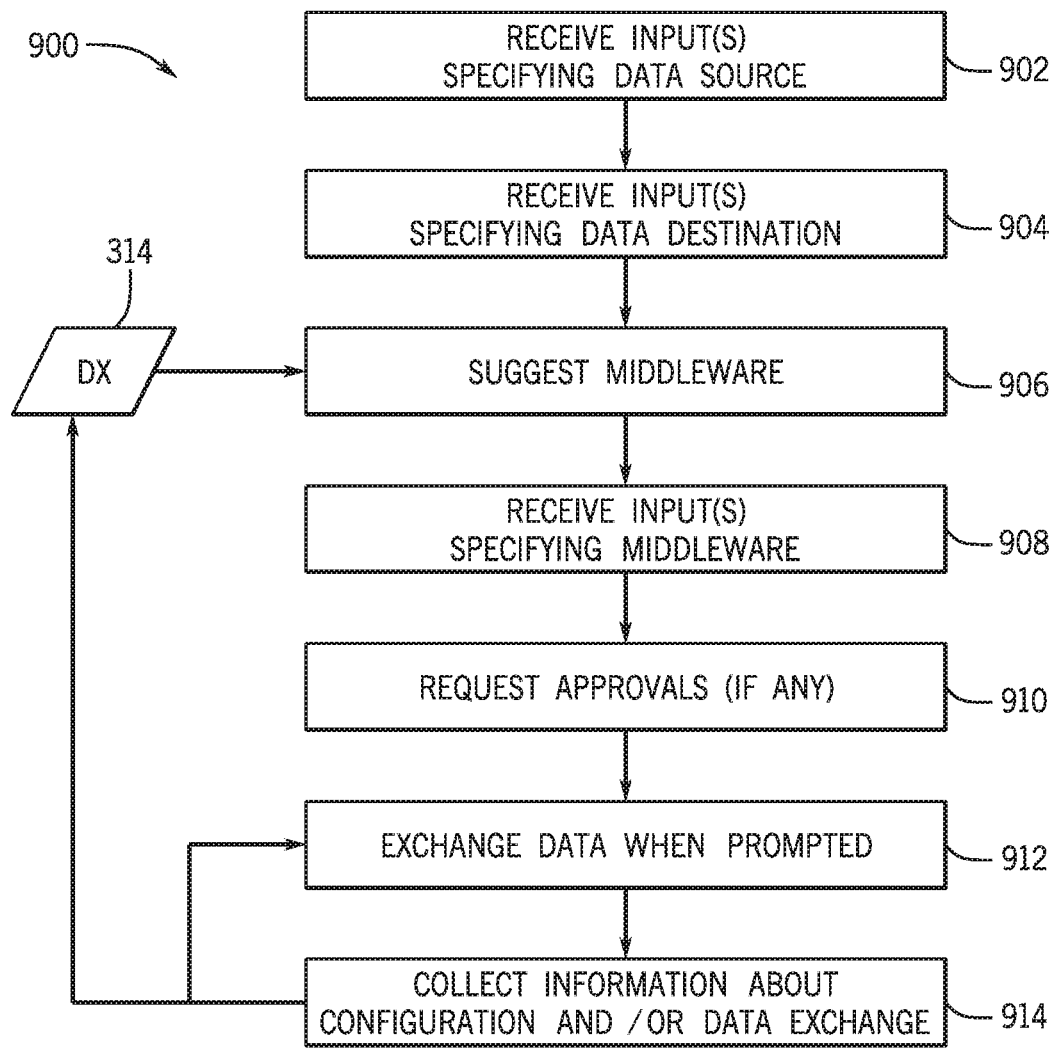
FIG. 22 is a flowchart of a process for using configurable adapters to exchange data between platforms via middleware, in accordance with an embodiment.

FIG. 22 is a flowchart of a process 900 for using configurable adapters to exchange data between platforms via middleware. In block 902, a user provides information via a graphical user interface about the source of the data to be exchanged. As shown and described with regard to FIGS. 8-11, this may include, for example, information about the source platform, the source application, a username and password for the source application, a table and field in which the data is stored, etc. In block 904, the user provides information via the graphical user interface about the destination of the data to be exchanged. As shown and described with regard to FIGS. 12-15, this may include, for example, information about the destination platform, the destination application, a username and password for the destination application, a table and field in which the data is to be stored, etc.

In some embodiments, the DX 314 may suggest a specific middleware based on the source and/or the destination. This recommendation may be based for example, on historical data collected from customers over time. In block 908, the user provides information via the graphical user interface about the middleware used to exchange the data. As shown and described with regard to FIGS. 16-18, this may include, for example, the adapter and/or messaging type of the middleware, whether the middleware is cloud-based or on-premises, the URL of the middleware, the status of the middleware, whether the middleware is recommended by the DX 314, etc. If middleware is suggested in block 906, the user may accept the suggestion and use the suggested middleware, or reject the suggestion and specify a different middleware. At block 910 approvals, if any, may be requested from those with approval power.

At block 912, the middleware retrieves the data from the data source and copies the data to the destination. The data exchange may be prompted by a request from a user (e.g., on demand), upon the expiration of a timer, at regularly scheduled intervals, upon the occurrence of some triggering event (e.g., source data is updated, etc.). In some embodiments, at block 914, information may be collected about the data exchange (e.g., was the data exchange successful, how long did the data exchange take, etc.) and provided to the DX 314 for storage in an exchange information log. As previously discussed, the DX may collect data from many customers and use machine learning techniques to analyze the data collected over time to make recommendations about configurations and generally improve the performance of data exchanges between platforms.

Figure 23:
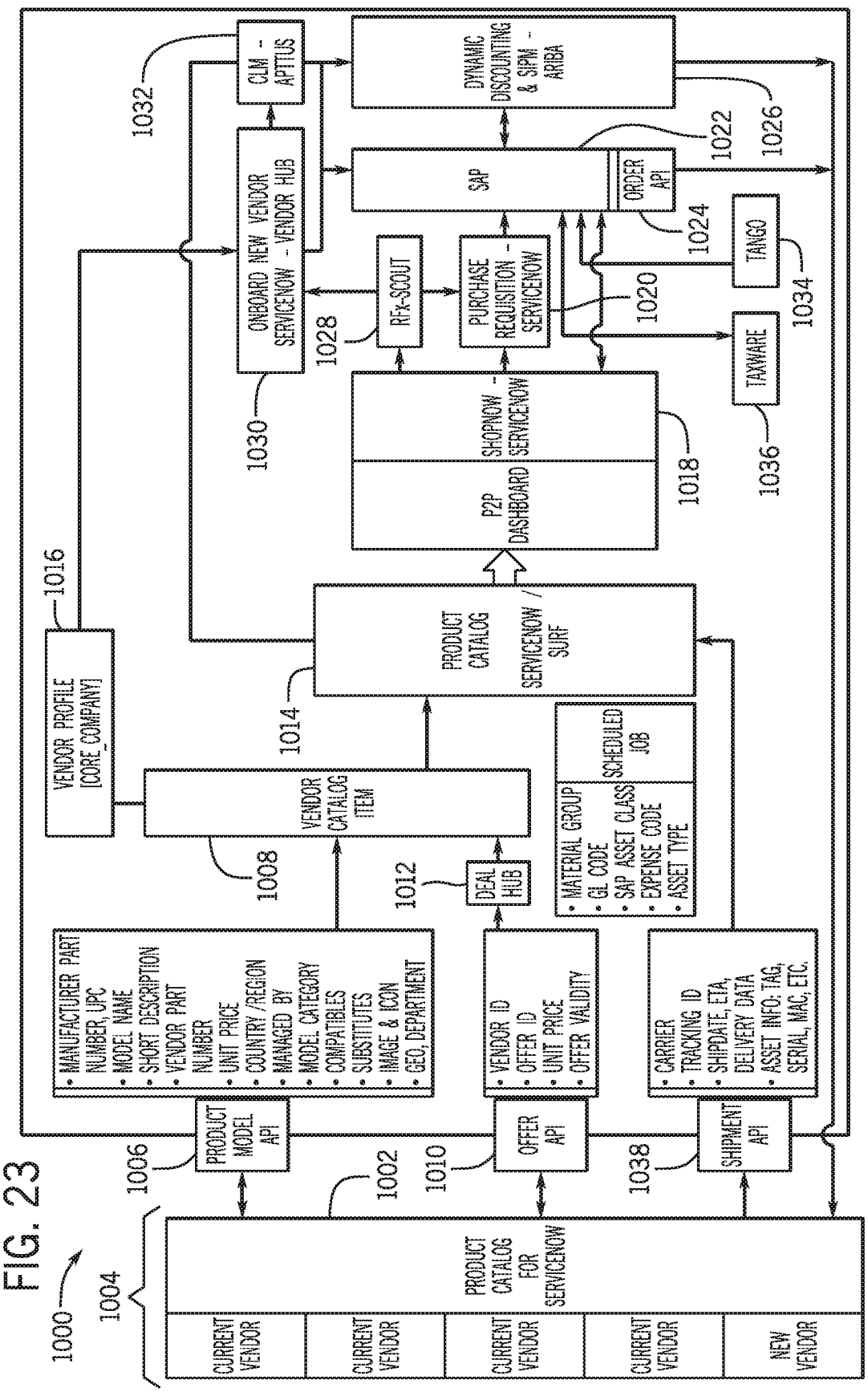
FIG. 23 is a schematic of a framework for purchasing products and/or services, in accordance with an embodiment.

Configurable adapters may be set up to facilitate the exchange of data between platforms without a user or developer writing scripts to facilitate the desired data exchange. As such, the configurable adapters disclosed herein may allow for the development of a framework having many platforms and/or applications in communication with one another to perform complex tasks. FIG. 23 is a schematic of a framework 1000 for purchasing. As shown, a product listing 1002 is generated based on products available from one or more vendors 1004. A product model API 1006 extracts and updates product model data for the products listed in the product listing 1002. As shown, the product model data may include, for example, manufacturer part number or UPC, model name, product description, vendor, vendor part number, unit price, country/region, managed by, model category, compatible products, substitute products, image and/or icon, department, lead time, in-stock or out of stock, etc. In some embodiments, the primary key for the product data is the manufacturer part number and/or the UPC. The product model API 1006 may update regularly (e.g., every Saturday) to ensure that all relevant fields for existing products are up to date and any new product models have been added. The product model API 1006 may also be configured to update on demand based on a command from a catalog administrator. If an update or addition of new product fails, the status code will be captured, reviewed by the catalog administrator and added. When new products are added, an approval task will be sent to the catalog administrator for approval. Once approved, the product will be available for users to purchase.

An offer API 1010 pulls or receives data from the vendors 1004 corresponding to various promotional offers from the vendors 1004 for one or more of the products collected by the product model API 1006. As with the product model API 1006, the primary data key is the manufacturer part number and/or UPC and the vendor ID of the vendor offering the promotional offer. The offer API 1010 updates on a regular schedule (e.g., every 12 hours), but an update can be initiated on-demand by the catalog administrator. The offer API 1010 may collect and store data corresponding to the vender ID, offer ID, unit price, the current promotional offer price, offer validity, previous promotional offer prices. The promotional information will be retained while the offer is valid (i.e., until the offer expires). Upon expiration of the offer, the displayed price may return to the normal unit price. All purchase orders created for items with a promotional offer may include an offer identification number and offer price for respective performance linked incentives. The offer identification number, and in some cases, other offer data will be available on both purchase requisition and purchase order line items. When new offers are added, review tasks will be created for the catalog administrator to review the new offers.

The offer API routes promotional offer details to a deal hub 1012. The deal hub 1012 acts as a transactional repository of all offers (current or expired) that have been offered by vendors 1004 via the offer API 1010. In some embodiments, only select users will have access to the deal hub 1012. The deal hub may display data related to an offer, such as vender name, deal source, offer ID, validity, unit price, currency, region, product model name, category, etc. Active deals with the lowest offer price for each vender will be displayed to the user with the vendor catalog item that corresponds to the product model. The offer will only display if the offer is valid. If there is no valid offer, the offer category will display as null. Further, if the deal is active, it may be flagged as "active" or otherwise emphasized/highlighted. Upon expiration of an offer, the offer will no longer be displayed to the user, but offer information will be saved and stored for future analysis and reference. In some embodiments, some users (e.g., catalog administrator or strategic sourcing team) may have the authority to create an offer manually. Further, some users may have the authority to request a quote from a vendor.

In some embodiments, the framework 1000 may also include a price check API that checks for lower prices than what is available in the catalog. In such embodiments, the price check API may be a dynamic API that runs behind the scenes to validate price information on an in-flight purchase requisition by querying manufacturer part number and/or UPC on performance linked incentives. When the manufacturer part number and/or UPC is successfully validated on active performance linked incentives, the price check API calls associated endpoints to validate whether or not there are lower prices (e.g., better promotional offers) to be taken advantage of. Accordingly, the price check API may be utilized to catch price reductions or competing offers on a vendor's platform. If competing price points exist, the lowest priced option will be updated to the catalog item as the unit price. The performance linked incentives will also be updated accordingly. The new lower price will exist as the new default unit price until the price is updated by the vendor.

Information from the product model API 1006 and the offer API 1010 (via the deal hub 1012) may be combined to create a vendor catalog item 1008 for each product available for purchase. The various catalog items 1008 combine to form a product catalog 1014. The product catalog 1014 is accessible by users via a marketplace 1018 (e.g., ShopNow)

with a peer-to-peer (P2P) dashboard interface that users may use to place orders for products within the product catalog 1014. In general, products will be auto-published to ShopNow 1018, but the catalog administrator may have the authority to publish or unpublish items via a catalog interface. Some items or categories of items may be set up to require a catalog administrator's approval before being listed on ShopNow for purchase. A scheduled job may be run at regular intervals (e.g., every hour, every 4 hours, every 6 hours, every 12 hours, once a day, etc.) to automatically publish items that are approved for publishing, but have not published yet. However, the catalog administrator may also have the authority to run the scheduled job upon request on demand. Items that have been manually removed from ShopNow 1018 by the catalog administrator will be marked as "retired" and will not be republished unless the status is updated to reinstated by the catalog administrator.

Orders placed by users may go through a purchase requisition component 1020, a financial management platform 1022, such as SAP® Financials, and then through an order API 1024 that communicates the order to the vendor 1004. A number of other integrated platforms may use order data for various purposes. For example, a dynamic discounting and supplier information and performance management platform 1026, such as SAP® ARIBA® may pull order data for analysis. Similarly, a sourcing a procurement management platform 1028, such as SCOUT®, may pull data to supply to a vendor hub 1030. The Vendor hub 1030 may provide data to the SAP® Financials platform 1022 and to a contract lifecycle management platform 1032, such as APTTUS®. Other platforms, such as, for example, TANGO® 1034, TAXWARE® 1036, etc., may also provide data to SAP® Financials 1022. For the sake of simplicity, the various platforms shown in FIG. 23 are connected by arrows, indicating communication between the platforms. It should be understood, however, that each of the communication arrows should be understood to include a middleware instance driven by one or more configurable adapters, as shown and described in FIG. 3.

Once the vendor 1004 ships the product, data may be provided to a shipment API 1038 that provides shipping information about the shipped product to the product catalog 1014. The shipping information may include, for example, the shipping carrier, tracking ID number, ship date, expected delivery date, delivery date (if already delivered), and product information, such as tag number, serial number, MAC, etc.

Figure 24:
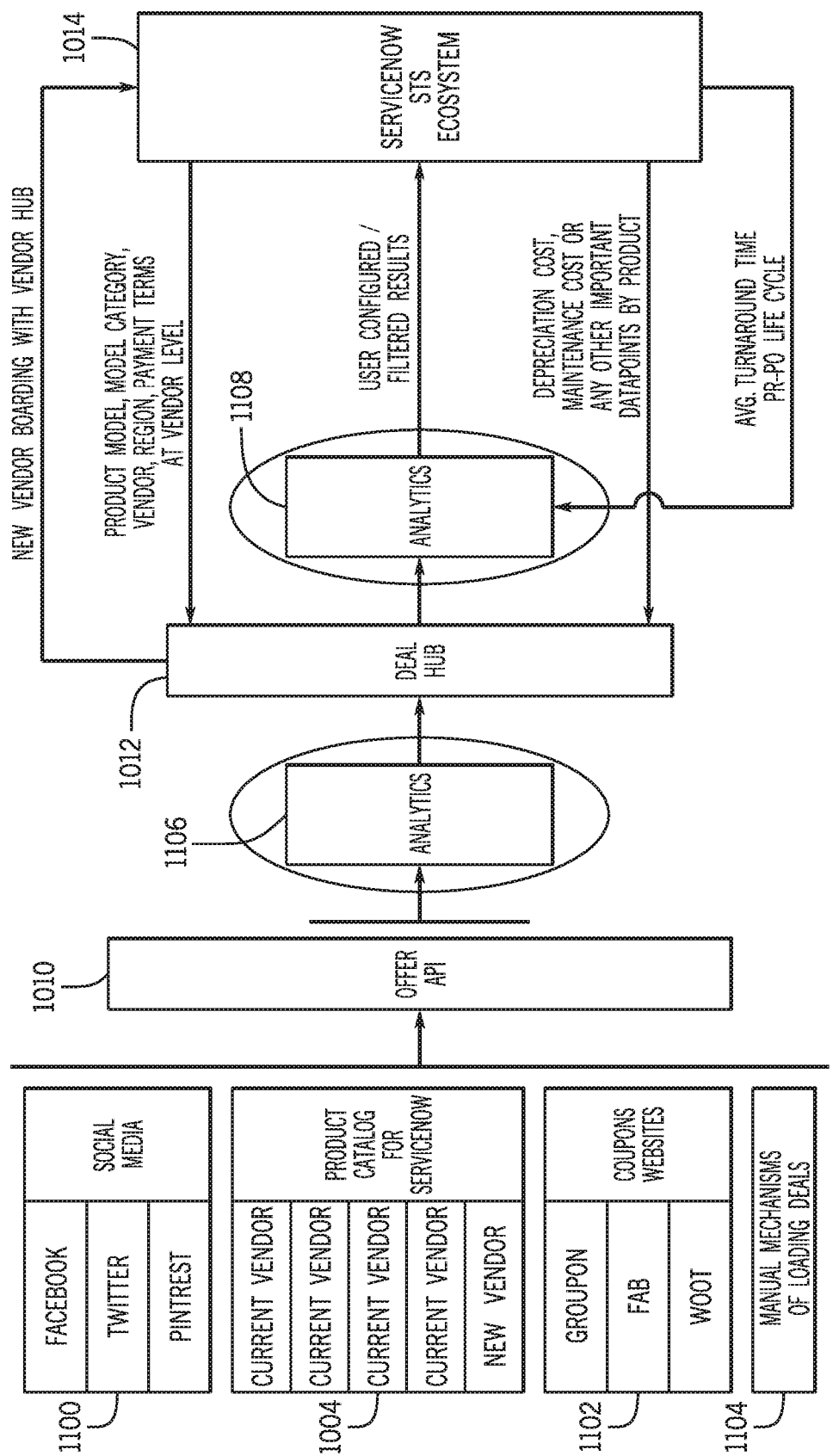
FIG. 24 is a schematic illustrating how analytics may be used to filter, sort, or otherwise clean up data pulled or received by an Offer API and/or a Deal Hub component of the framework of FIG. 23, in accordance with an embodiment.

FIG. 24 is a schematic illustrating how analytics may be used to filter, sort, or otherwise clean up data pulled or received by the Offer API and/or the Deal Hub. As shown, in addition to vendors 1004, the offer API 1010 may pull or receive offers from, or find out about offers from, social media platforms 1100, such as FACEBOOK®, TWITTER®, PINTEREST®, etc. That is, offers for various products and/or services may be posted on a social media platform that is otherwise not pulled by the offer API 1010 form the vendors 1004. The Offer API 1010 may also use one or more coupon websites/services 1102, such as GROUPON®, FAB®, WOOT®, etc. to find offers for products and/or services. Finally, in some embodiments, there may also be a manual mechanism 1104 for loading deals to be incorporated into the data pulled by the offer API 1010. Once offer data is pulled or received by the offer API 1010, the data may be run through an analytics component 1106. The analytics component 1106 may be configured to pre-process (e.g., filter, sort, remove duplicate, etc.) data received by the offer API 1010. For example, the analytics component 1106 may be configured to remove expired offers or offers that are not yet active. The analytics component 1106 may also remove irrelevant offers. For example, based on search terms, the offer API 1010 may return false positives and retrieve offers that are not actually relevant, such as returning kitchen supplies to a company that does chemical processing, etc.

In other embodiments, the analytics component 1106 may retrieve an offer from a new vendor that is lower than offers for the same product or service from existing vendors. In such a case, the analytics component 1106 may flag the new vendor for review and approval or recommend that the new vendor be on-boarded. The analytics component 1106 may then provide the pre-processed data to the deal hub 1012. The deal hub was shown and discussed with regard to FIG. 24.

A second analytics component 1108 may be disposed between the deal hub and the product catalog 1014 to further process the offer data. For example, the second analytics component 1108 may be configured to capture negative or positive impressions for products, services, and/or vendors based on posted reviews, social media posts or comments, blogs, etc. Accordingly, the second analytics component 1108 may remove listings associated with products, services, and/or vendors having overwhelmingly negative reviews or feedback. The second analytics component 1108 may also be configured to track offer data over time and take note of trends in the data. For example, the second analytics component may notice regular (e.g., seasonal) variations in deals that are somewhat consistent year to year, month to month, week to week, etc. Further, the second analytics component may observe that there is an ideal period or periods of time in advance to buy plane tickets, reserve hotel rooms or rental cars, etc. Accordingly, recommendations may be made to the customer in the product catalog as to when the customer should make the purchase.

A user may configure the offer API 1010, the deal hub 1012, and/or the analytics components 1106, 1108 to only provide data that the user is interested. Alternatively, or in addition, the user may provide feedback (e.g., "show me more deals like this", "do not show me any more deals like this", "do not show deals from this vender", "do not show offers for products or services that are poorly rated", etc.), which the system may use to fine-tune the underlying algorithms. In some embodiments, machine learning may be utilized for customization of the offer API 1010, the deal hub 1012, and/or the analytics components 1106, 1108 based on a user's feedback or the behavior of a user (e.g., never purchasing items from a vendor). Additionally, machine learning may be utilized to display like products and services (e.g., substitutes) next to or near one another. Though first and second analytics components 1106, 1108 are shown in FIG. 24, it should be understood that in other embodiments, there may be a single analytics components that performs the described functions, or more than two analytics components 1106, 1108 disposed along the data path between the vendors 1004 and the product catalog 1014. Further, in some embodiments, the described functionality may be performed by the offer API 1010 and/or the deal hub 1012.

Figure 25:
FIG. 25 is an embodiment of a table of data provided to a product catalog of the framework of FIG. 23, in accordance with an embodiment.

FIG. 25 is an embodiment of a table 1200 of data provided to the product catalog. As shown, the table includes the product information pulled or received by the product model API, combined with offer data pulled by the offer API, and data pulled by or produced by the deal hub. As shown, a record is generated for each product or service offered by each vendor. Each record is allocated a row of the table

1200. Each record may include data corresponding to various data fields, such as, for example, the product or service name 1202, the product or service category 1204, the manufacturer 1206, the vendor 1208, the region 1210, the offer start date 1212, the offer end date 1214, the acceptable use date 1216 (e.g., an expected earliest date that a given purchase could be made considering normal lead times for quotes, final purchase price, approval, etc.), the percentage discount 1218, a rating 1220 (e.g., according to user reviews, professional reviewers, consumer reports, etc.), an offer type 1222 (e.g., purchase, lease, subscription, service, etc.), the offer state 1224 (e.g., not yet active, active, expiring soon, expired, etc.), the net payment term of the offer 1226, vendor status 1228, etc.

In some embodiments, the table 1200 may include financial data (e.g. in a financial mode or in a normal mode), such as material group, GL code, asset class, expense code, etc. Further, product models that are mapped to a model category may inherit financial data attributes associated with the model category. Financial data may be updated dynamically (e.g., when a new product listing is created), or automatically at regularly scheduled intervals. When financial data is updated for a category of products and/or services, all of the products and/or services belonging to the category may also be updated. In some embodiments, a scheduled job may run at regular intervals (e.g., monthly, weekly, daily, etc.) during times of low traffic (e.g., nights, weekends, etc.) to ensure that all listed product models conform to prescribed data attribute assignments. Anomalies may be automatically fixed or trigger the creation of an alert. In some embodiments, the scheduled job may also be run on-demand upon request of the catalog administrator or another user with authority.

In some embodiments, the data may be sortable by some or all of the listed data fields. It should be understood, however, that a record may not include data for all listed fields. For example, some of the listed products do not include an acceptable use date. In such instances, no value may be displayed, or a place holder (e.g., "n/a") indicating that no data is available. Further, it should be understood that data may be collected and/or displayed beyond what is shown in table 1200. Within the product catalog, the data may be displayed to the user in a similar fashion as shown in FIG. 25, or the data may be provided to a user interface that organizes and displays the data in other formats, including a format configured by the user.

Returning to FIG. 23, in some embodiments, ShopNow 1018 and/or the purchase requisition component 1020 may automate or semi-automate purchasing. For example, in some embodiments, purchases of products and/or services may occur at regular intervals (e.g., annually, quarterly, monthly, weekly, etc.), or when an amount of a product dips below some threshold value. In such an embodiment, a purchase request may be automatically created. The purchase request may be sent to a designated person for approval and then sent out to the vendor. In other embodiments, some purchases may have a blanket approval (e.g., for a specific purchase and/or below a specified price). In other embodiments, the deal hub 1012 may automatically generate an alert or generate a purchase request when an offer is received for a specified product offering a product below a specified price or at a percentage discount above some threshold amount, purchasing a specified about of a product or service. Upon approval, if not already done, a purchase request may be generated and sent out for approval. A purchase order may then be sent out to the vendor.

Figure 26:
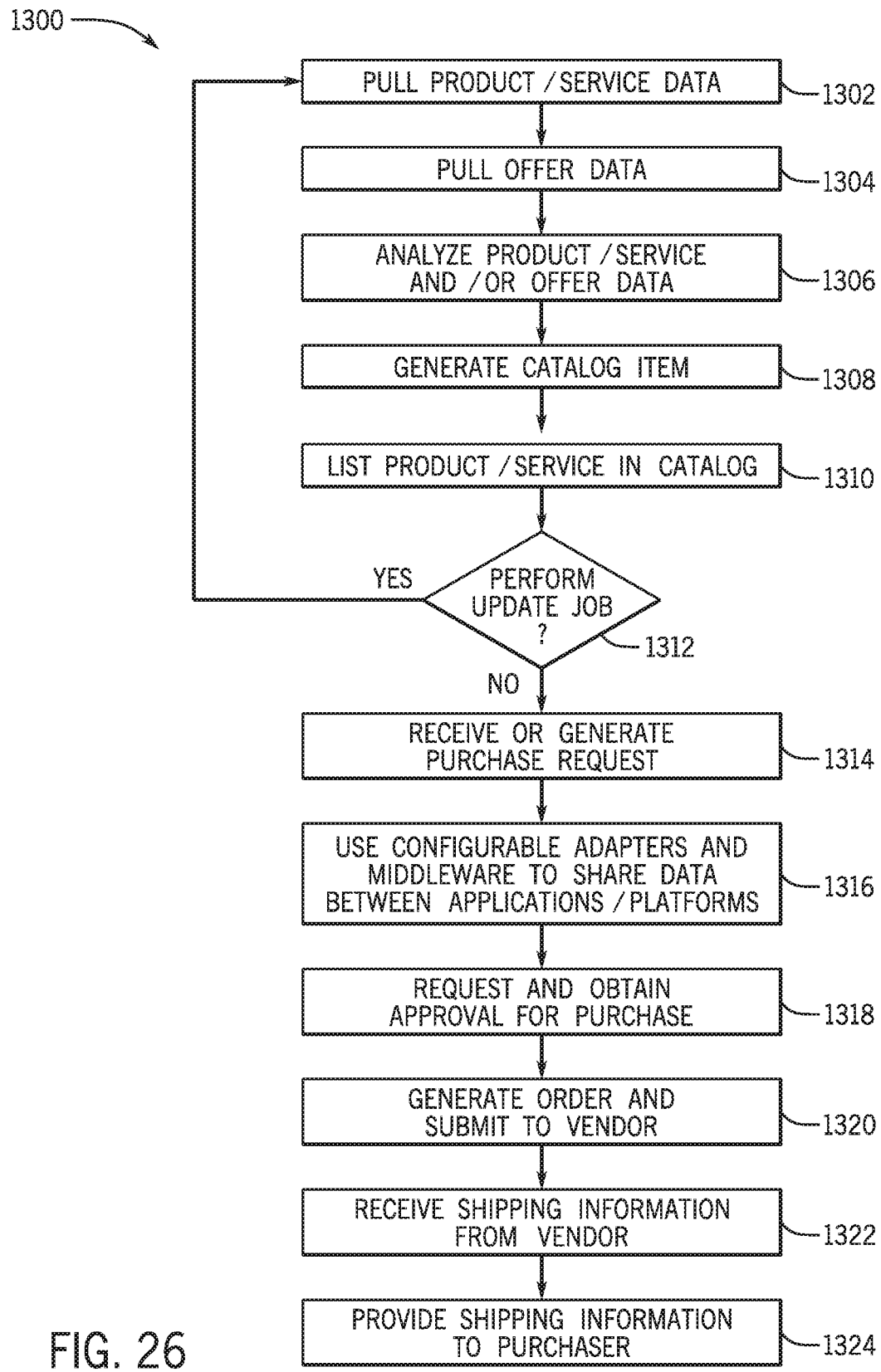
FIG. 26 is a flow chart of a process for populating, operating, and maintaining, a shopping interface for an organization utilizing the framework of FIG. 23, in accordance with an embodiment.

FIG. 26 is a flow chart of a process 1300 for populating, operating, and maintaining, a shopping interface for an organization. In block 1302 product/service data is pulled or received (e.g., by a product model API). As shown and discussed with regard to FIGS. 23 and 24, the product/service data may be pulled directly form one or more vendors, from one or more social media platforms, from one or more coupon services, from one or more manual mechanisms for loading deals, or from other sources. The product model data may include, for example, manufacturer part number or UPC, model name, product description, vendor, vendor part number, unit price, country/region, managed by, model category, compatible products, substitute products, image and/or icon, department, lead time, in-stock or out of stock, etc. In some embodiments, the primary key for the product data is the manufacturer part number and/or the UPC.

In block 1304, offer data is pulled or received for one or more of the products corresponding to one or more promotional offers for the products in question. The offer data may include, for example, to the vender ID, offer ID, unit price, the current promotional offer price, offer validity, previous promotional offer prices, etc.

At block 1306, the product/service and/or offer data may be analyzed. As discussed with regard to FIG. 24, processing may include, for example, filtering data, sorting data, removing duplicate records, removing expired offers or offers that are not yet active, removing offers for irrelevant products, flagging offers from vendors that are not in the system, organizing reviews and/or feedback for products, track and/or changes in offers over time, forecast likely changes in offers based on historical data, implement user configurations and/or preferences, etc.

At block 1308, the analyzed product model and offer data for a product are combined to generate a catalog item. At block 1310 the catalog item is listed (e.g., displayed within a graphical user interface) in the catalog for users to view and purchase. At decision 1312, the process 1300 determines whether an update job should be performed. Update jobs may be performed at regular intervals (hourly, daily, weekly, monthly, quarterly, etc.), or on demand at the request of the catalog administrator. If it is time for a regularly scheduled update job, or an update job has been requested, the process 1300 returns to block 1302 and begins pulling product/service data to update the catalog. If it is not time for a regularly scheduled update job, or an update job has not been requested, the process 1300 proceeds to block 1314.

At block 1314 a purchase request is generated by a user and submitted or automatically generated. In some embodiments, the purchase request is reviewed and approved, however not all purchase requests may require an approval. At block 1318 configurable adapters and middleware may be used to share data between various applications and/or platforms to facilitate the purchase of the product or service and create appropriate records of the purchase for accounting, tax, or other purposes.

At block 1318, approval for the purchase in question is requested and obtained. It should be understood that in some embodiments, requesting and/or obtaining approval may occur before, during, or after data is shared between the various platforms and/or applications creating records for the purchase. At block 1320, the order is submitted and provided to the vendor (e.g., via the order API). At block 1322 the vendor may confirm the order and provide shipping information, which may be received by the shipment API. At block 1324 the shipping information may be forwarded to the user that requested the order.

Though FIGS. 23-26 and the corresponding discussion above are directed to a framework for managing purchases using the configurable adapters to facilitate the exchange of data between platforms, it should be understood that this is just one possible example of how configurable adapters may be used to build up large, complex frameworks of platforms and/or applications to perform one or more tasks of an enterprise. Accordingly, it should be understood that many other embodiments of frameworks that utilize configurable adapters to facilitate the exchange of data between platforms are also envisaged.

Configurable adapters may be used in conjunction with middleware to share data between various platforms and/or applications without a user, developer, or IT agent writing one or more scripts to facilitate the sharing of data. Further, as various platforms and applications are updated, the configurable adapters and middleware may also dynamically update so a user does not have to spend time updating a script to work with the updated platforms/applications. Using configurable adapters and middleware, large complex frameworks of many platforms/applications may be designed to perform various functions of an enterprise or organization. For example, as discussed with regard to FIGS. 23-26, such a framework may be designed to pull product information from various vendors or third parties, as well as promotional offers for those products. The product and offer data may be combined, processed, and listed in a product catalog, which users may use to shop for and order products or services. The configurable adapters and middleware may then be used to allow platforms and/or applications used by the enterprise to share data about the order and create appropriate records (e.g., for book keeping, accounting, taxes, facilities, etc.). Accordingly, the use of configurable adapters and middleware may significantly reduce or even eliminate the amount of script writing and other software development done to create a complex framework of platforms and/or applications to perform complex tasks within an enterprise.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a non-transitory memory; and
one or more hardware processors configured to read instructions from the non-transitory memory to perform operations comprising:
receiving, via a product model API, product model data for a product sold by a vendor;
receiving from the vendor, via an offer API, offer data corresponding to one or more promotional offers for the product;
processing, via a deal hub, the offer data, wherein the processed offer data is stored in a first table;
providing, via a machine learning component, identification of a suggested middleware instance, wherein the machine learning component is trained using historical data collected from past exchanges of data to suggest a middleware instance of a plurality of middleware instances based on a source table, a destination table, or both;
generating, via the suggested middleware instance, a catalog item for the product based on the processed offer data stored in the first table, wherein data defining the catalog item is disposed in a second table;
displaying the catalog item within a catalog; and
updating the catalog item, wherein the update is based on a triggering event.

2. The system of claim 1, wherein the operations comprise:
receiving a purchase request for the product;
requesting, via a graphical user interface (GUI), approvals from one or more approvers;
receiving, via the GUI, approvals from the one or more approvers;
generating a purchase order based on the purchase request; and
sending, via an order API, the purchase order to the vendor.

3. The system of claim 2, wherein the operations comprise:
generating purchase data based on the purchase request or the purchase order;
storing the purchase data in a third table of a first platform;
providing, via the machine learning component, identification of the suggested middleware instance based on one or more attributes associated with a source table, a destination table, or both; and
copying, via the suggested middleware instance, the purchase data to a destination location specified by a configurable adapter, wherein the destination location comprises a fourth table of a second platform.

4. The system of claim 1, wherein the operations comprise:
extracting price data for the product from the offer data;
storing the price data for the product in a price log; and
analyzing the price data stored in the price log to recognize one or more trends in the price data.

5. The system of claim 4, wherein the operations comprise forecasting a future price of the product based on the analysis of the price data in the price log.

6. The system of claim 1, wherein the deal hub is configured to consider one or more ratings for the product in processing the offer data.

7. The system of claim 1, wherein the operations comprise receiving the offer data from one or more social media platforms.

8. The system of claim 1, wherein the operations comprise receiving the offer data from one or more coupon services.

9. A system, comprising:
a non-transitory memory; and
one or more hardware processors configured to read instructions from the non-transitory memory to perform operations comprising:

generating a graphical user interface, wherein the graphical user interface is configured to display a plurality of catalog items for a plurality of respective products stored in a second table, wherein each of the catalog items is created and updated based on product model data received from a vendor by a product model API and promotional offer data stored in a first table and received from the vendor via an offer API, via a suggested middleware instance identified by a machine learning component, wherein the machine learning component is trained using historical data collected from past exchanges of data to suggest a middleware instance of a plurality of middleware instances based on a source table, a destination table, or both; and receiving a purchase request for one of the plurality of respective products.

10. The system of claim 9, wherein the operations comprise:

requesting, via a graphical user interface (GUI), approvals from one or more approvers;

receiving, via the GUI, approvals from the one or more approvers;

generating a purchase order based on the purchase request; and sending, via an order API, the purchase order to the vendor.

11. The system of claim 10, wherein the operations comprise:

generating purchase data based on the purchase request or the purchase order;

storing the purchase data in a third table of a first platform;

providing, via the machine learning component, identification of the suggested middleware instance based on one or more attributes associated with a source table, a destination table, or both; and copying, via the suggested middleware instance, the purchase data to a destination location specified by a configurable adapter, wherein the destination location comprises a fourth table of a second platform.

12. The system of claim 9, wherein the operations comprise:

extracting price data for a product of the plurality of respective products from the promotional offer data;

storing the price data for the product in a price log; and analyzing the price data stored in the price log to recognize one or more trends in the price data.

13. The system of claim 12, wherein the operations comprise forecasting a future price of the product based on the analysis of the price data in the price log.

14. The system of claim 9, wherein the system is configured to consider one or more ratings for the product in processing the promotional offer data.

15. The system of claim 9, wherein the operations comprise receiving the promotional offer data from one or more social media platforms or one or more coupon services.

16. A method, comprising:

receiving, via a product model API, product model data for a product sold by a vendor;

receiving from the vendor, via an offer API, offer data corresponding to one or more promotional offers for the product;

processing, via a deal hub, the offer data, wherein the processed offer data is stored in a first table;

providing, via a machine learning component, identification of a suggested middleware instance, wherein the machine learning component is trained using historical data collected from past exchanges of data to suggest a middleware instance of a plurality of middleware instances based on a source table, a destination table, or both;

generating, via the suggested middleware instance, a catalog item for the product based on the processed offer data stored in the first table, wherein data defining the catalog item is disposed in a second table;

displaying the catalog item within a catalog; and updating the catalog item, wherein the update is based on a triggering event.

17. The method of claim 16, comprising:

receiving a purchase request for the product;

requesting, via a graphical user interface (GUI), approvals from one or more approvers;

receiving, via the GUI, approvals from the one or more approvers;

generating a purchase order based on the purchase request; and sending, via an order API, the purchase order to the vendor.

18. The method of claim 17, comprising:

generating purchase data based on the purchase request or the purchase order;

storing the purchase data in a third table of a first platform;

providing, via the machine learning component, identification of a suggested middleware instance based on one or more attributes associated with a source table, a destination table, or both; and copying, via the suggested middleware instance, the purchase data to a destination location specified by a configurable adapter, wherein the destination location comprises a fourth table of a second platform.

19. The method of claim 16, comprising:

extracting price data for the product from the offer data;

storing the price data for the product in a price log;

analyzing the price data stored in the price log to recognize one or more trends in the price data; and forecasting a future price of the product based on the analysis of the price data in the price log.

20. The method of claim 16, wherein processing the offer data considering one or more ratings for the product.

* * * * *